(12) United States Patent
Alexandrov et al.

(10) Patent No.: US 9,282,289 B2
(45) Date of Patent: Mar. 8, 2016

(54) SYSTEMS, METHODS, AND DEVICES FOR GENERATING A SUMMARY DOCUMENT OF AN ONLINE MEETING

(75) Inventors: Albert Alexandrov, Goleta, CA (US); Bernd Oliver Christiansen, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 647 days.

(21) Appl. No.: 12/978,214

(22) Filed: Dec. 23, 2010

(65) Prior Publication Data
US 2012/0166921 A1 Jun. 28, 2012

(51) Int. Cl.
| | | |
|---|---|---|
| *G06F 17/00* | (2006.01) | |
| *H04N 7/15* | (2006.01) | |
| *G06F 17/21* | (2006.01) | |
| *G06F 17/30* | (2006.01) | |
| *G06Q 10/10* | (2012.01) | |
| *H04L 29/06* | (2006.01) | |
| *H04L 12/18* | (2006.01) | |

(52) U.S. Cl.
CPC .............. *H04N 7/155* (2013.01); *G06F 17/211* (2013.01); *G06F 17/212* (2013.01); *G06F 17/30056* (2013.01); *G06Q 10/10* (2013.01); *H04L 12/1831* (2013.01); *H04L 65/403* (2013.01); *H04L 65/4015* (2013.01)

(58) Field of Classification Search
CPC . G06F 17/30843; G06F 17/212; G06F 17/24; G06F 17/241; G06F 17/30837; G06F 17/30017; G06F 17/211; G06F 17/30056; G06Q 10/10; H04L 65/4015; H04L 65/403; G04L 12/1831; H04N 7/155

USPC .................. 715/202, 230, 231, 255, 751, 753
See application file for complete search history.

(56) References Cited

U.S. PATENT DOCUMENTS

| | | |
|---|---|---|
| 5,553,083 A | 9/1996 | Miller |
| 5,572,728 A * | 11/1996 | Tada et al. |
| 5,727,002 A | 3/1998 | Miller |
| 5,764,235 A | 6/1998 | Hunt et al. |
| 5,826,025 A | 10/1998 | Gramlich |
| 5,845,265 A | 12/1998 | Woolston |
| 5,956,027 A | 9/1999 | Krishnamurthy |
| 6,081,829 A | 6/2000 | Sidana |
| 6,167,432 A | 12/2000 | Jiang |
| 6,246,758 B1 | 6/2001 | Low |

(Continued)

FOREIGN PATENT DOCUMENTS

EP 1796378 6/2007

OTHER PUBLICATIONS

International Search Report and the Written Opinion dated Jun. 14, 2012 from Corresponding PCT/US2011/066396.

(Continued)

*Primary Examiner* — Thu Huynh
(74) *Attorney, Agent, or Firm* — BainwoodHuang

(57) ABSTRACT

In various embodiments, an attendee of a live online meeting selects screen data from an earlier point in time in the online meeting for playback while the meeting is still ongoing. Automatically generated image thumbnails of the screen data for the online meeting may be employed to navigate to the earlier point in time. Attendees may annotate screenshots associated with the thumbnails, and a summary document may be generated that includes the screenshots and the annotations.

24 Claims, 15 Drawing Sheets

(56) References Cited

U.S. PATENT DOCUMENTS

| | | | |
|---|---|---|---|
| 6,249,291 B1 | 6/2001 | Popp et al. | |
| 6,343,313 B1 | 1/2002 | Salesky et al. | |
| 6,590,602 B1* | 7/2003 | Fernandez et al. | 348/14.08 |
| 6,741,977 B1* | 5/2004 | Nagaya | H04N 5/765 |
| 7,007,235 B1 | 2/2006 | Hussein et al. | |
| 7,013,327 B1 | 3/2006 | Hickman et al. | |
| 7,103,806 B1 | 9/2006 | Horvitz | |
| 7,197,535 B2 | 3/2007 | Salesky et al. | |
| 7,251,696 B1 | 7/2007 | Horvitz | |
| 7,298,930 B1* | 11/2007 | Erol et al. | 382/305 |
| 7,310,675 B2 | 12/2007 | Salesky et al. | |
| 7,330,895 B1 | 2/2008 | Horvitz | |
| 7,369,515 B2 | 5/2008 | Salesky et al. | |
| 7,418,476 B2 | 8/2008 | Salesky et al. | |
| 7,426,191 B2 | 9/2008 | Salesky et al. | |
| 7,593,987 B2 | 9/2009 | Salesky et al. | |
| 7,627,663 B2 | 12/2009 | Salesky et al. | |
| 7,644,144 B1 | 1/2010 | Horvitz et al. | |
| 7,715,331 B2 | 5/2010 | Salesky et al. | |
| 7,716,344 B2 | 5/2010 | Salesky et al. | |
| 7,779,355 B1* | 8/2010 | Erol | G06F 17/30253 715/231 |
| 7,813,304 B2 | 10/2010 | Salesky et al. | |
| 7,814,475 B2* | 10/2010 | Cohen et al. | 717/168 |
| 7,822,859 B2 | 10/2010 | Salesky et al. | |
| 7,836,163 B2 | 11/2010 | Salesky et al. | |
| 7,870,240 B1 | 1/2011 | Horvitz | |
| 7,877,489 B2 | 1/2011 | Salesky et al. | |
| 7,934,002 B2 | 4/2011 | Salesky et al. | |
| 8,300,081 B1 | 10/2012 | Sawyer | |
| 8,325,213 B2* | 12/2012 | Lamb et al. | 348/14.01 |
| 2002/0161862 A1 | 10/2002 | Horvitz | |
| 2002/0165721 A1 | 11/2002 | Chang | |
| 2002/0174199 A1 | 11/2002 | Horvitz | |
| 2003/0140159 A1 | 7/2003 | Campbell | |
| 2003/0160871 A1* | 8/2003 | Pelletier et al. | 348/207.99 |
| 2004/0003042 A1 | 1/2004 | Horvitz et al. | |
| 2004/0179036 A1 | 9/2004 | Teplov et al. | |
| 2004/0181577 A1 | 9/2004 | Skurikhin et al. | |
| 2004/0181579 A1 | 9/2004 | Huck et al. | |
| 2004/0181796 A1 | 9/2004 | Fedotov et al. | |
| 2004/0236830 A1* | 11/2004 | Nelson et al. | 709/204 |
| 2005/0038886 A1 | 2/2005 | Garg | |
| 2005/0078868 A1* | 4/2005 | Chen et al. | 382/171 |
| 2005/0084082 A1 | 4/2005 | Horvitz et al. | |
| 2005/0091253 A1* | 4/2005 | Cragun | G06F 17/30525 |
| 2006/0010206 A1 | 1/2006 | Apacible et al. | |
| 2006/0031755 A1* | 2/2006 | Kashi | 715/512 |
| 2006/0161838 A1* | 7/2006 | Nydam et al. | 715/512 |
| 2008/0052742 A1* | 2/2008 | Kopf et al. | 725/34 |
| 2009/0003339 A1 | 1/2009 | Katis et al. | |
| 2009/0055745 A1 | 2/2009 | Christiansen | |
| 2009/0089651 A1* | 4/2009 | Herberger et al. | 715/202 |
| 2009/0119246 A1* | 5/2009 | Kansal | 707/2 |
| 2009/0125589 A1* | 5/2009 | Anand | H04L 65/1083 709/204 |
| 2009/0138906 A1* | 5/2009 | Eide et al. | 725/32 |
| 2009/0282437 A1* | 11/2009 | Malec et al. | 725/40 |
| 2010/0037151 A1* | 2/2010 | Ackerman et al. | 715/753 |
| 2010/0146403 A1 | 6/2010 | Stevens | |
| 2010/0153548 A1* | 6/2010 | Wang et al. | 709/224 |
| 2010/0250771 A1* | 9/2010 | Chen et al. | 709/231 |
| 2010/0306674 A1 | 12/2010 | Salesky et al. | |
| 2010/0333127 A1 | 12/2010 | Scott et al. | |
| 2011/0013558 A1 | 1/2011 | Chang | |
| 2011/0016179 A1 | 1/2011 | Bechtel | |
| 2012/0005596 A1 | 1/2012 | Carlson et al. | |
| 2014/0032655 A1 | 1/2014 | Pegg | |

OTHER PUBLICATIONS

U.S. Appl. No. 09/523,315, filed Mar. 10, 2000, Salesky.

U.S. Appl. No. 60/014,242, filed Mar. 26, 1996, Salesky.

"CU-SeeMe Software Product," Brought to you by the Cu-SeeMe Development Team of the Advanced Technologies and Planning group of the Network Resources Division of Cornell Information Technologies, pp. 1-8 (1995).

"ORCA Video Conferencing System", Manual Written by the National Oceanic and Atmospheric Administration's Office of Ocean Resources Conservation and Assessment for Operation of the CU-SeeMe System, 26 pages (1995).

Abdel-Waha et al., "XTV: A Framework for Sharing X Window Clients in Remote Synchronous Collaboration," IEEE Conference, pp. 1-15 (1991).

Bolot et al., "Scalable Feedback Control for Multicast Video Distribution in the Internet," SIGCOMM 94, London England, pp. 58-67 (1994).

Chen et al., "Real Time Video and Audio in the World Wide Web", 1995.

Cox, "Global Schoolhouse Project," http://www.virtualschool.edu/mon/academia (2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pp. 99-104 (1993).

Dorcey, "CU-SeeMe Desktop Videoconferencing Software," Connexions the Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic + XTV = CoReview," Computer Networks and ISDN Systems, pp. 1-19 1995.

McCanne et al., "Receiver-Driven Layered Multicast," ACM SIGCOMM, pp. 1-14 (1996).

Sattler, "Internet Tv with CU-SeeMe", Book, 323 pages (1995).

Savetz et al., "MBONE: Multicasting Tomorrow's Internet," IDG Books Worldwide, Inc., (1996).

US 5,715,404, 02/1998, Katseff et al. (withdrawn)

* cited by examiner

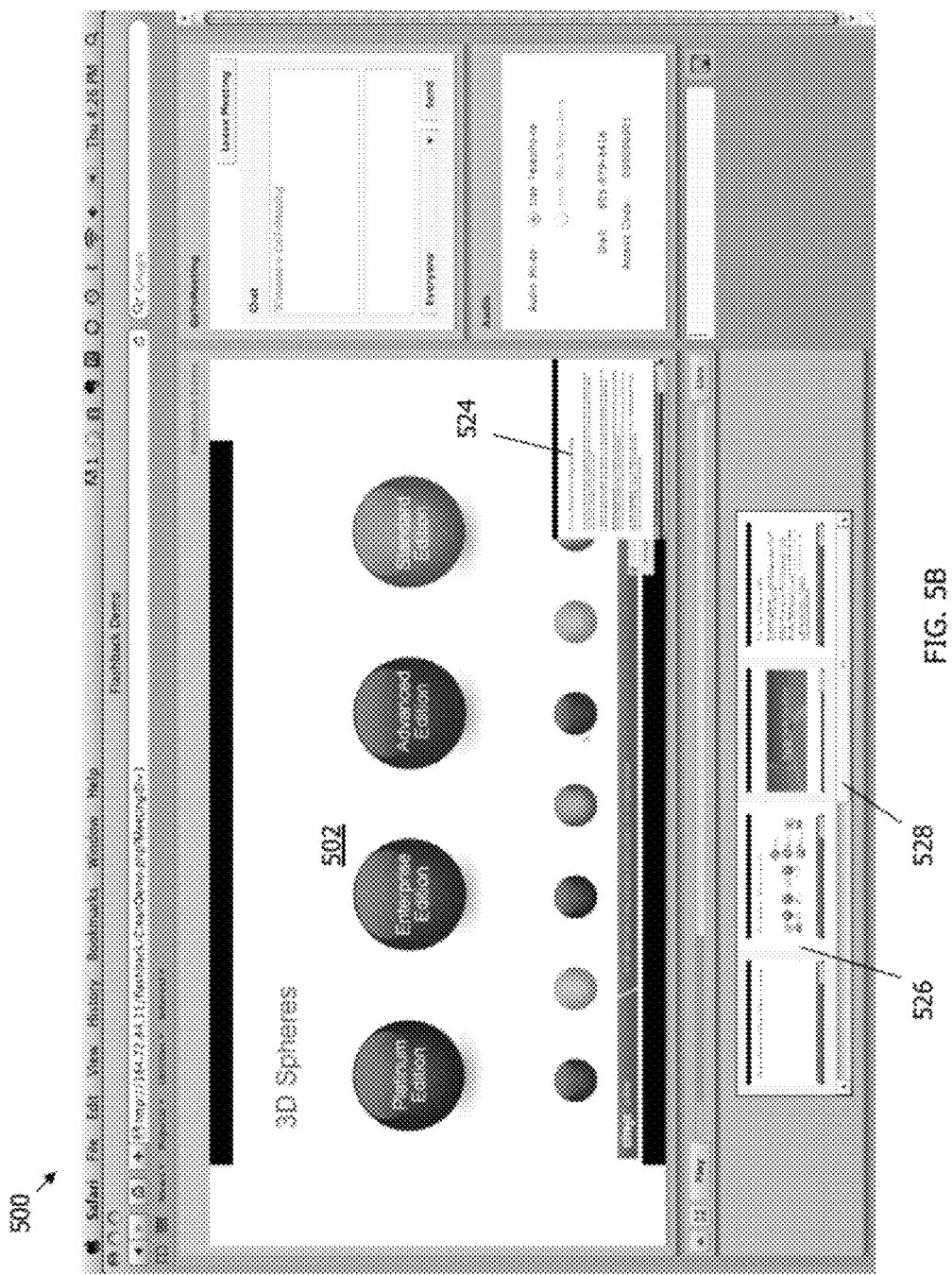

SYSTEMS, METHODS, AND DEVICES FOR GENERATING A SUMMARY DOCUMENT OF AN ONLINE MEETING

TECHNICAL FIELD

Embodiments of the invention generally relate to the presentation and viewing of online meetings and, more specifically, to time-shifting playback of a live online meeting and to navigating the time-shifted portion of the live online meeting.

BACKGROUND

As economies globalize and travel costs increase, meetings that may have once been held face-to-face are increasingly being held remotely. Often, a purely telephonic meeting inefficiently conveys the ideas presented. Accordingly, computer-based online meetings featuring graphical data have become more common. The graphical data may include presentation slides, video, and/or a computer application or desktop window, and may be sent from a presenter to one or more viewers. Each viewer receives some form of the graphical data along with, typically, a verbal commentary by the presenter synchronized to the graphical data. The voice-over data may be sent through a traditional telephone network, e.g., a public switched-telephone network ("PSTN"), or through a computer-network protocol, e.g., voice-over-internet protocol ("VoIP"). The online meeting is typically "live" in the sense that voice and graphical data generated by a presenter are conveyed to the viewer as they occur, i.e., in real time while the meeting is still ongoing, as opposed to a pre-recorded presentation viewed after the meeting has ended.

Typically, with today's technology, a viewer of a live online meeting must be present for the entirety of the meeting or risk missing some of its content. Disadvantageously, an outside event or computer malfunction may cause an interruption in the viewing of the meeting, and an affected viewer may be unable to view a key part of the meeting. Furthermore, a viewer may wish for more time to study graphical data presented on the viewer's screen before the meeting proceeds to the next topic or may wish to further review earlier-presented video or audio data. In addition, a viewer who joins a meeting after it has started may wish to view the material he or she has missed. Unfortunately, many of these features are not well supported by existing technology.

Accordingly, a need exists for improved systems and methods of presenting and viewing live online meetings.

SUMMARY

In general, various aspects of the systems and methods described herein relate to displaying a previously presented portion of an online meeting while the meeting is still ongoing (i.e., while the meeting is "live"). In one embodiment, a viewer's screen displays live screen data for a current point in time (i.e., the live portion of the meeting), and, while being displayed, the live screen data is also stored for later use. During the live online meeting, the viewer may specify an earlier point in time, and the viewer's screen may then display screen data from the earlier point in time. In other words, a viewer may pause and rewind a live online meeting while the meeting is ongoing. As further described below, key screenshots representing the stored screen data may be generated in response to trigger events, and thumbnails generated from the key screenshots may then be used to aid navigation through the stored content. The viewer may annotate the key screenshots with notes, and a summary of the meeting may be generated using the key screenshots and/or annotations.

In general, in one aspect, embodiments of the invention feature a method for generating (e.g., by a server or viewer computing device) a summary document of an online meeting. The method includes storing, in computer memory, at least a portion of screen data representing a previously presented portion of an online meeting, capturing a plurality of screenshots in response to trigger events, and combining the plurality of screenshots to generate a summary document summarizing the online meeting. Each screenshot may be based at least in part on the stored screen data and is representable as an image thumbnail.

In general, in another aspect, embodiments of the invention feature a system for generating a summary document on an online meeting. The system includes a storage device for storing at least a portion of screen data representing a previously presented portion of an online meeting, an image processing module for capturing a plurality of screenshots in response to trigger events, and a combining module for combining the plurality of screenshots to generate a summary document summarizing the online meeting. Again, each screenshot may be based at least in part on the stored screen data and is representable as an image thumbnail.

In general, in yet another aspect, embodiments of the invention feature an article of manufacture that includes computer-readable instructions thereon for generating a summary document of an online meeting. The article of manufacture includes instructions to store, in computer memory, at least a portion of screen data representing a previously presented portion of an online meeting, instructions to capture a plurality of screenshots in response to trigger events, and instructions to combine the plurality of screenshots to generate a summary document summarizing the online meeting. Yet again, each screenshot may be based at least in part on the stored screen data and is representable as an image thumbnail.

In various embodiments of these aspects of the invention, the summary document is transmitted to a viewer computing device attending the meeting. An annotation may be received from the viewer computing device and may be added to the summary document. The annotation may either be encrypted or unencrypted. Similarly, the screenshots may be encrypted or not.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 5B is an exemplary screenshot of a user interface for viewing previously presented screen data during an ongoing online meeting in accordance with another embodiment of the invention;

DETAILED DESCRIPTION

Described herein are various embodiments of methods and systems for displaying a previously presented portion of an ongoing online meeting.

A. Time-Shifting Playback of a Live Online Meeting

Figure 1:
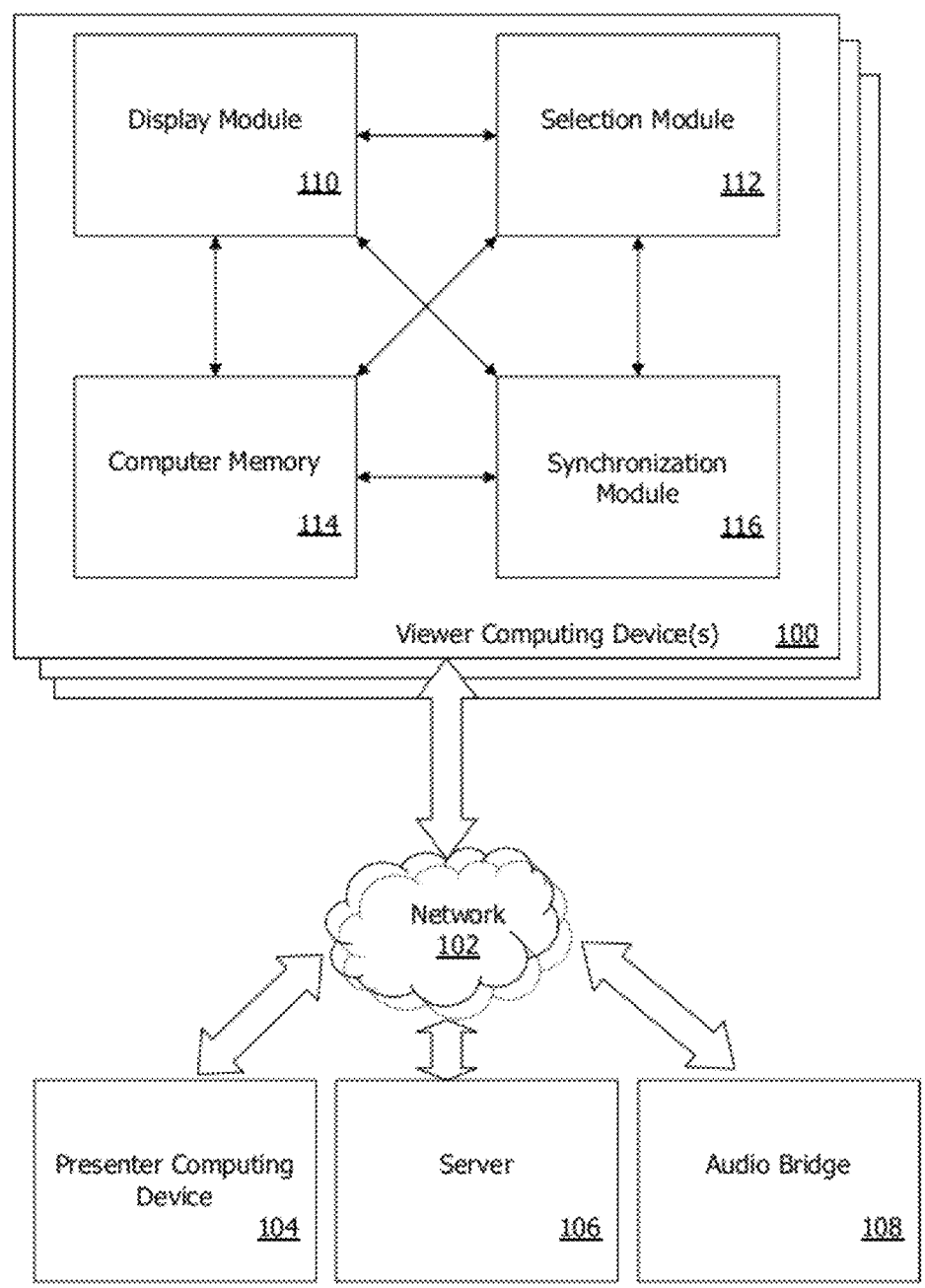
FIG. 1 is a block diagram illustrating a system for displaying a previously presented portion of an ongoing online meeting in accordance with one embodiment of the invention.

FIG. 1 illustrates one embodiment of a viewer computing device 100 for displaying, during an ongoing online meeting, a previously presented portion of the meeting. As illustrated, the viewer 100 may be connected to a network 102, such as the Internet or a local- or wide-area network, to which a presenter computing device 104 may also be connected. Other devices connected to the network 102 may include a server 106 and an audio bridge 108. Additional viewers 100 may also be connected to the network 102. The one or more viewers 100 and the presenter 104 may be collectively referred to as meeting attendees.

The operation of the viewer 100, the presenter 104, and the other components depicted in FIG. 1 are explained in greater detail below, but, in general, the presenter 104 presents a live online meeting to the one or more viewers 100. Each viewer 100 views a latest state of a screen of the presenter 104 as it is received from the presenter 104. In one embodiment, the server 106 receives the screen updates from the presenter 104 and distributes them to the one or more viewers 100. The presenter 104 and/or server 106 may distribute the screen updates to the viewers 100 in a bandwidth-adaptive manner, as described in greater detail below, to account for differences in the network bandwidth linking each viewer 100. Thus, the live screen data viewed at a first viewer 100 may be slightly different than the live screen data viewed at a second viewer 100, especially if the first and second viewers 100 have different network connection speeds. Even if a viewer 100 has a slow connection, however, the screen data it views is still considered live because it continually updates its state to synchronize with a live state of a presenter's screen, even if it is updated less frequently than a viewer 100 having a faster connection.

An audio feed may also be distributed from the presenter 104 to accompany the screen updates distributed therefrom. The audio feed may be distributed over a public switched-telephone network ("PSTN"), using a voice-over-internet protocol ("VoIP"), or by using a mixture of the two. The audio bridge 108 may be used to mix PSTN voice data from the presenter 104 and/or viewers 100 and to distribute the mixed voice data to the presenter 104 and/or viewers 100. VoIP voice data may be mixed by the server 106 and/or viewers 100.

Both the viewer computing devices 100 and the presenter computing device 104 may be any type of personal computer, Windows-based terminal, network computer, wireless device, information appliance, workstation, mini computer, main frame computer, personal digital assistant, handheld device, or other computing device that is capable of both presenting information/data to, and receiving commands from, a user thereof. For example, each of the viewer computing devices 100 and the presenter computing device 104 may include a visual display device (e.g., a computer monitor), a data entry device (e.g., a keyboard), persistent and/or volatile storage (e.g., computer memory), a processor, and a mouse. In one embodiment, each of the viewer computing devices 100 and the presenter computing device 104 includes a web browser, such as, for example, the INTERNET EXPLORER program developed by Microsoft Corporation of Redmond, Wash., to connect to the World Wide Web.

For its part, the server 106 may be any computing device capable of receiving information/data from and delivering information/data to (e.g., over the network 102) the viewer computing devices 100, the presenter computing device 104, and/or the audio bridge 108. The audio bridge 108 may also be any computing device having the functionality described herein. For example, the server 106 and audio bridge 108 may each include computer memory for storing computer-readable instructions, and a central processing unit for executing such instructions.

The viewer computing devices 100, the presenter computing device 104, the server 106, and the audio bridge 108 may be connected to the network 102 through a variety of connections including, but not limited to, standard telephone lines, LAN or WAN links (e.g., T1, T3, 56 kb, X.25), broadband connections (e.g., ISDN, Frame Relay, ATM), or wireless connections. The connections, moreover, may be established using a variety of communication protocols (e.g., HTTP, TCP/IP, IPX, SPX, NetBIOS, NetBEUI, SMB, Ethernet, ARCNET, Fiber Distributed Data Interface (FDDI), RS232, IEEE 802.11, IEEE 802.11a, IEEE 802.11b, IEEE 802.11g, and direct asynchronous connections).

As illustrated in FIG. 1, the viewer 100 may include a display module 110, a selection module 112, computer memory 114, and a synchronization module 116. The display module 110 may cause the display of live screen data received from the presenter 104 as well as the display of stored screen data previously received from the presenter 104. The live and/or stored screen data may be displayed on a computer monitor, a notebook/netbook screen, the screen of a handheld device such as a smartphone or personal digital assistant, or any other screen capable of displaying visual information.

In one embodiment, the selection module 112 receives, from a user of the viewer computing device 100, a selection representing a point in time earlier than a current point in time in the live online meeting. The selection may be made using any kind of user input device, such as, for example, a keyboard, a mouse, a stylus, a touchscreen, or voice-to-text input. The selection module 112 may then instruct the display module 110 to display, while the online meeting is still ongoing, the portion of the online meeting corresponding to the selected time, as described in greater detail below.

For its part, the computer memory 114 may store at least a portion of the live screen data received from the presenter 104 and/or audio data associated therewith. The computer memory 114 (as well as any other memory or storage device described herein) may be any kind of commonly available computer memory, such as static random-access memory ("SRAM") or dynamic random-access memory ("DRAM"). The synchronization module 116 may synchronize playback of the stored audio data with the display of the stored screen data, as described further below.

Each of the display module 110, selection module 112, and synchronization module 116 (as well as any other module described herein) may be implemented as any software program and/or hardware device, for example an application specific integrated circuit (ASIC) or a field programmable gate array (FPGA), that is capable of providing the functionality described herein. It will be understood by one having ordinary skill in the art that the modules illustrated in the various figures and their organization are conceptual, rather than explicit, requirements. For example, two or more of the modules 110, 112, 116 may be combined into a single module, such that the functions described herein as being performed by the distinct modules 110, 112, 116 are in fact performed by the single module. In addition, it should be understood that any single one of the modules described herein may be implemented as multiple modules, such that the functions described herein as being performed by the single module are in fact performed by the multiple modules.

It will also be understood by those skilled in the art that FIG. 1 is a simplified illustration of the system and that it is depicted as such to facilitate the explanation of the present invention. The depiction of the system in FIG. 1 is non-limiting. Moreover, the system may be modified in of a variety of manners without departing from the spirit and scope of the invention.

Figure 2:
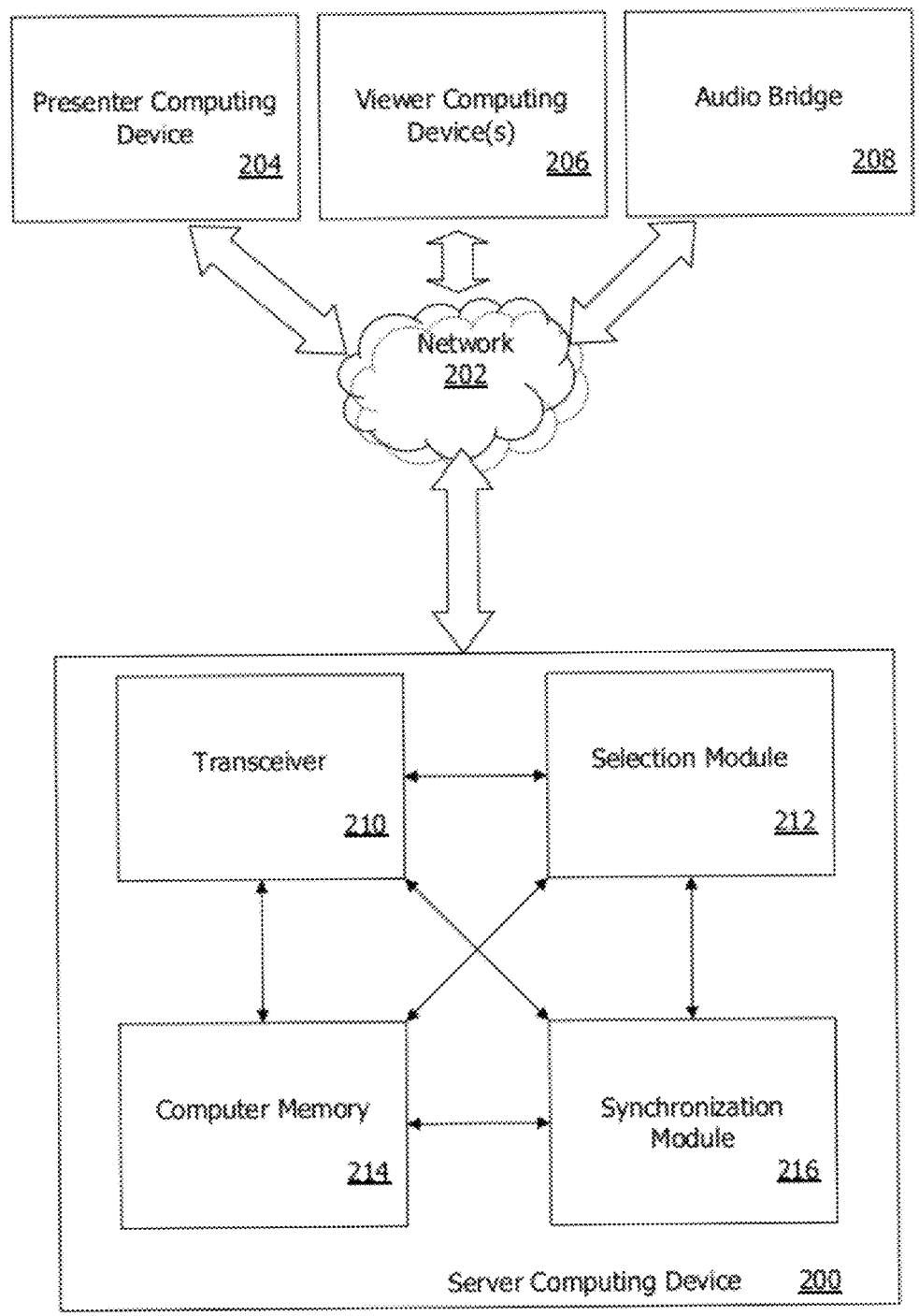
FIG. 2 is a block diagram illustrating a system for facilitating the display of a previously presented portion of an ongoing online meeting in accordance with one embodiment of the invention.

For example, FIG. 2 illustrates, in an alternative embodiment, a server computing device 200 for facilitating the display, during an ongoing online meeting, of a previously presented portion of the meeting. The server 200 may be connected to a presenter computing device 204, one or more viewer computing devices 206, and/or an audio bridge 208 via a network 202. The presenter 204 hosts an online meeting and sends live screen data to the server 200, which stores the live screen data and/or audio data associated therewith in computer memory 214. A selection module 212 receives, from a user of one of the viewer computing devices 206, a selection of a point in time earlier than a current point in time of the live online meeting and instructs a transceiver 210 to transmit the stored screen data corresponding to the earlier point in time to the viewer 206. The transceiver 210 may further transmit to the viewer 206 stored audio data corresponding to the earlier point in time. For its part, the synchronization module 116 may synchronize the stored audio data with the stored screen data prior to their transmission, as described further below.

The transceiver 210 illustrated in FIG. 2 (as well as any other transceiver described herein) may be implemented as any hardware device, or software module with a hardware interface, that is capable of receiving and transmitting communications, including requests, responses, and commands, such as, for example, inter-processor communications and networked communications. Moreover, although depicted as a transceiver 210 in FIG. 2, the functions performed thereby may in fact be performed by a separate receiver and transmitter (not shown). Again, such a receiver and transmitter (as well as any other receiver or transmitter described herein) may be implemented as any hardware device, or software module with a hardware interface.

Figure 3:
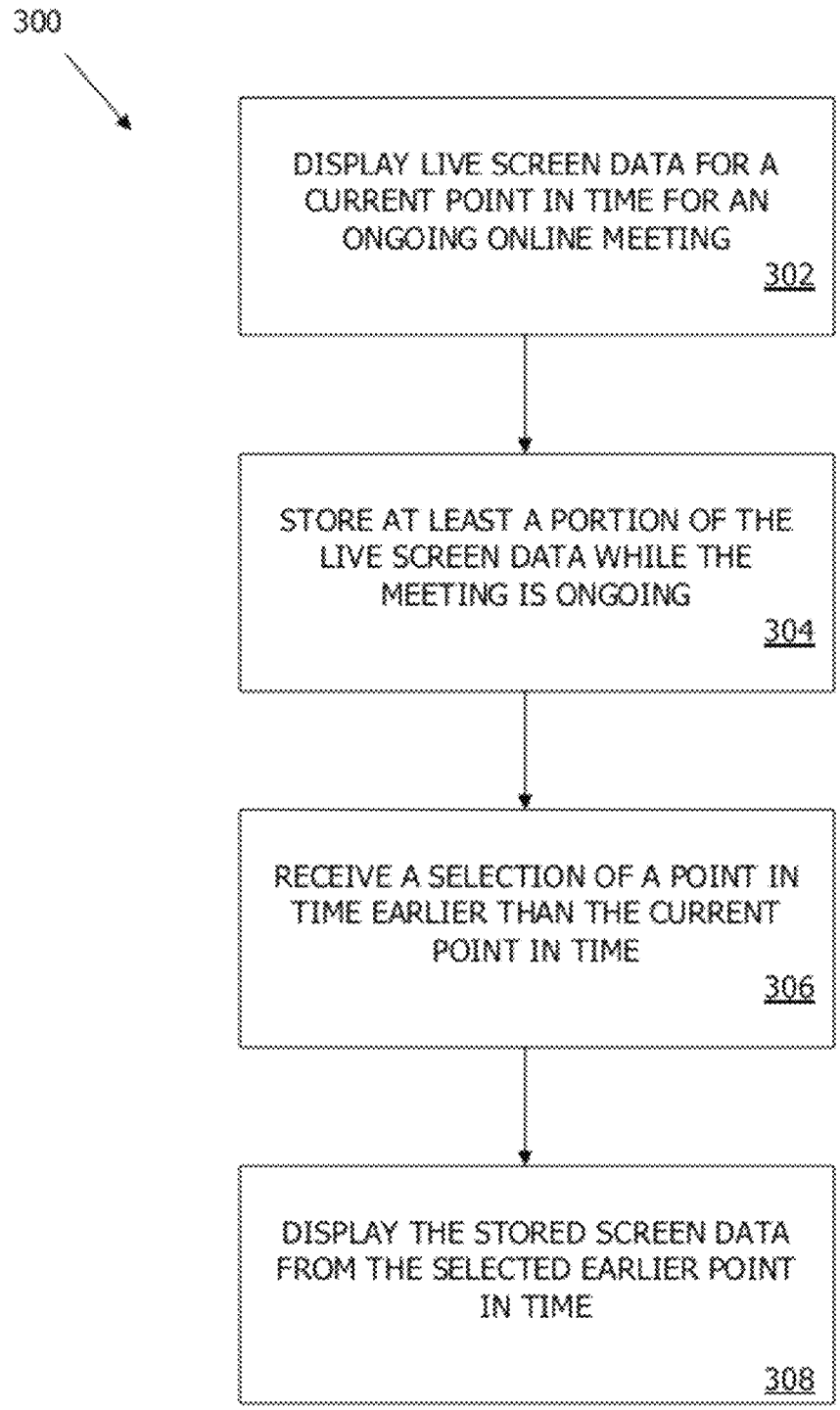
FIG. 3 is a flowchart illustrating a method for displaying a previously presented portion of an ongoing online meeting in accordance with one embodiment of the invention.

FIG. 3 illustrates a method 300 for displaying, during an ongoing online meeting, a previously presented portion of the meeting. In particular, the method 300 may be employed where the previously presented portion of the meeting is stored on a viewer computing device 100, as is represented, for example, in FIG. 1. In summary, in accordance with the method 300, live screen data is displayed at the viewer computing device 100 for a current point in time for the ongoing online meeting (Step 302). While the meeting is ongoing, at least a portion of the live screen data is stored in the computer memory 114 (Step 304). A selection of a point in time earlier than the current point in time is then received at the viewer computing device 100 (Step 306). The stored screen data from the earlier point in time may then be displayed on the viewer computing device 100 while the meeting is still ongoing (Step 308).

In greater detail, at Step 302, the viewer computing device 100 receives live screen data from the presenter computing device 104, and its display module 110 causes the display of the live screen data (e.g., on a screen) to a user of the viewer computing device 100. For example, each device 100, 104 may be running one or more software applications to facilitate communication with the network 102, such as a collaboration program for identifying, authenticating, and joining an online meeting. The collaboration program may be a local application or a web-based interface, and the live screen data may thus be displayed in an application window or in a full-screen mode at the viewer computing device 100.

As the viewer computing device 100 receives the live screen data for the current point in time of the online meeting, the viewer computing device 100 also stores at least a portion of that live screen data in the computer memory 114 (Step 304). For example, the live screen data may be received as a data stream and displayed on a screen of the viewer 100 as it arrives. Instead of discarding the live screen data after it has been displayed and viewed, however, the live screen data is retained in the computer memory 114. In one embodiment, the live screen data is stored in the computer memory 114 before image decompression and display (i.e., the live screen data is stored in a compressed format). If the computer memory 114 is too small to store the live screen data (whether in a compressed or decompressed format), some or all of the data may be additionally stored on other media, such as a hard disk drive or non-volatile memory such as flash memory. Regardless of how and/or where the live screen data is stored, however, it is accessible for later retrieval. The stored screen data may be cataloged according to its time or order of display to simplify retrieval thereof.

As live screen data is being displayed on the viewer 100, a user may select a point in time earlier than a current point in time of the online meeting and request retrieval and playback of the stored screen data corresponding to that earlier point in time (Step 306). A variety of input mechanisms may be used to aid the user in selecting the earlier point in time. For example, a user interface of the viewer computing device 100 may provide play, pause, rewind, and/or fast forward controls to the user, and the user may select an earlier point in time by, for example, selecting the rewind control until the desired point in time is reached. Alternatively or in addition, the user interface may provide a time-index slider bar that allows the user to click and drag a slider control to specify an earlier point in time. A user may also enter an exact time into a dialog box and specify the earlier time directly. As described further below, other mechanisms, such as image thumbnails of the stored screen data, may be available to aid the user in making the selection.

Once the selection is made, the stored screen data corresponding to the selection is displayed to the user (Step 308). In one embodiment, the display of the stored screen data replaces the display of the live screen data. For example, the display of the live screen data in a window may be interrupted to display therein the stored screen data from the earlier point in time. Alternatively, in another embodiment, the stored screen data is displayed in a second, separate window while the display of the live screen data continues in a first window. In still other examples, the stored screen data may be displayed as an inset or picture-in-picture within the display of the live screen data, and a control may be provided to swap the stored and live screen data between the main and inset displays. As will be understood by one of ordinary skill in the art, any other method for displaying multiple application windows, or multiple windows within one application, are within the scope of the current invention.

Figure 4:
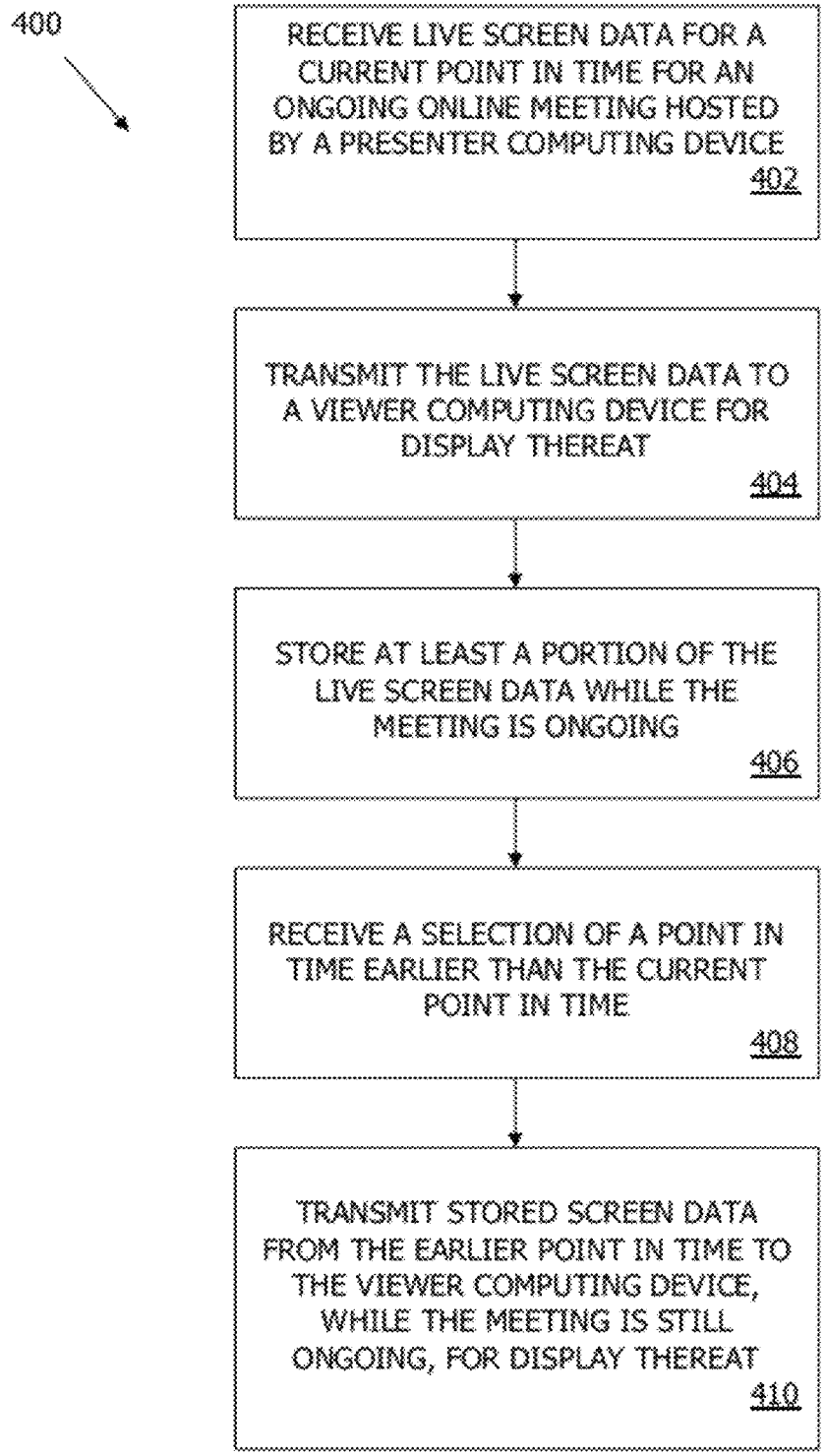
FIG. 4 is a flowchart illustrating a method for facilitating the display of a previously presented portion of an ongoing online meeting in accordance with one embodiment of the invention.

FIG. 4 illustrates a method 400 for facilitating the display, during an ongoing online meeting, of a previously presented portion of the meeting. In particular, the method 400 may be employed where the ongoing online meeting is hosted by a presenter computing device 204 and the previously presented portion of the meeting is stored on a server computing device 200, as is represented, for example, in FIG. 2. In summary, in accordance with the method 400, live screen data for a current point in time of the online meeting is received at the server computing device 200 from the presenter 204 (Step 402). The live screen data is then transmitted from the server computing device 200 to one or more viewer computing devices 206 for display thereat (Step 404). At least a portion of the live screen data is stored on the server computing device 200 while the meeting is ongoing (Step 406). Eventually, a selection of a point in time earlier than the current point in time is received, for example from a user of one of the viewer computing devices 206, at the server computing device 200 (Step 408). Stored screen data from the earlier point in time may then be transmitted from the server computing device 200 to the viewer computing device 206 for display thereat while the meeting is still ongoing.

In greater detail, screen data for an online meeting hosted by the presenter computing device 204 is sent to the server computing device 200 at Step 402. For example, the presenter 204 may host the meeting by creating, editing, and storing a presentation in secure local storage and then transmitting its screen content (which represents a portion of the presentation) to one or more viewer computing devices 206, via the server 200, only at the time of the presentation. Thus, by hosting the meeting, the presenter 204 may retain full control over the content of the presentation, which may be especially important when the viewers 206 represent unknown or unsecure devices. In one embodiment, the server 200 transmits the live screen data received from the presenter 204 to the viewer(s) 206 at Step 404. As explained further below, the live screen data may be transmitted to the viewer(s) 206 in a bandwidth-adaptive manner.

The server 200 also stores at least a portion of the live screen data in its computer memory 214 (Step 406). As explained above, other storage devices may additionally be used to store the live screen data. Eventually, the server 200 receives a selection of a point in time earlier than a current point in time of the ongoing online meeting from, for example, a viewer computing device 206 (Step 408), and transmits stored screen data from the earlier point in time to the viewer computing device 206 in response (Step 410). Again, a user of the viewer computing device 206 may make the selection by, for example, rewinding to, forwarding to, and/or seeking the stored screen data through a user interface presented at the viewer computing device 206, by selecting an image thumbnail representing the stored screen data, or by any other method described herein. Once received, the stored screen data from the earlier point in time may be displayed at the viewer computing device 206 as the live online meeting is still ongoing, as described above.

Storing the screen data on the server 200 has certain advantages. For example, a single saved copy of the stored screen data may be distributed, upon request, to each viewer 206, insuring that each viewer 206 has access to the same stored data. A viewer 206 may then be assured that fellow viewers 206 experience the same screen data when the viewers 206 select the same, previous point in time. In various embodiments, the presenter 204 has control over the screen data stored on the server 200 and limits its use by the viewers 206, which may be important if the screen data contains, for example, copyrighted or trade secret material. As another advantage, a viewer 206 may be a low-power or handheld device and may not be capable of storing screen data; these types of viewers 200 benefit from moving the storing function upstream to the server 200.

Storing the screen data on each viewer, such as the viewers 100 described with reference to FIG. 1, offers advantages as well. With reference again to FIG. 1, the server 106 and/or the network 102 connected thereto may not be capable of handling the load presented by transmitting both live screen data and stored screen data. Thus, by storing the screen data on the viewer computing device(s) 100, no additional network traffic is generated when a viewer 100 selects an earlier point in time for viewing. Furthermore, when the viewers 100 store the screen data, a server 106 may not be required to conduct the live online meeting.

In one embodiment, if a viewer 100, 206 joins an ongoing online meeting after the meeting has already begun, the viewer 100, 206 may view the live screen data and may also select an earlier point in time in the meeting (by, e.g., rewinding the meeting) to view a missed portion of the meeting. If the screen data is stored on a server 200, as described with reference to FIGS. 2 and 4, a viewer 206 may send a request to the server 200 for the screen data at a point in time corresponding to the missed portion. If, on the other hand, the screen data is stored on the viewers 100, as described with reference to FIGS. 1 and 3, the late joining viewer 100 may not have immediate access to the missed portion of the meeting because the late joining viewer 100 was not previously present in the meeting to store the previous screen data. In this case, the synchronization module 116 may send a request to a fellow viewer 100 for the missing screen data. In one embodiment, upon joining the meeting, the late joining viewer 100 automatically detects other viewers 100 and automatically requests that the missing screen data be sent therefrom. Once received, the missing screen data is stored, although not necessarily immediately displayed, on the late joining viewer 100 (e.g., the missing screen data may only be displayed when the late joining viewer 100 later selects a point in time falling within the time period represented by the missing screen data). In another embodiment, the late joining viewer 100 sends a request for missing screen data only when a user selects a point in time that falls within the time period represented by the missing screen data. Either the late joining viewer 100 or the other viewers 100 may disable synchronization for security or bandwidth concerns. In another embodiment, the late joining viewer 100 receives the missing screen data from the presenter 104.

Navigation through the stored screen data may be done locally (e.g., a viewer 100, 206 views stored screen data only on its own screen) or globally (e.g., a viewer 100, 206 may cause the stored screen data to be viewed on one or more other viewers 100, 206 as well as itself). For example, during a live online meeting, an attendee may seek back through previously viewed screen data to find a particular point in the online meeting and view the screen data at that point. In another embodiment, an attendee (either a viewer 100, 206 or the presenter 104, 204 for example) may wish to present previously viewed screen data to a plurality of other attendees in order to, for example, ask a question or clarify a point regarding the previously viewed screen data. In this embodiment, the attendee may cause the group of other attendees to view the same previously viewed screen data with the use of a single navigation control. For example, a viewer 100, 206 may send a command to other viewers 100, 206 and/or the presenter 104, 204 in accordance with a selection of previously viewed screen data, and the recipients of the command may seek to a point in the previously viewed screen data in accordance with the selection.

As described above, live audio data may be sent over a PSTN network or via a VoIP protocol. In one embodiment, live audio data is sent from the presenter 104, 204 to the viewers 100, 206 along with the live screen data. The viewers 100, 206 may also generate live audio data when they, for example, ask questions or give feedback to the presenter 104, 204.

PSTN data may be captured by the audio bridge 108, 208 and stored thereon and/or transmitted therethrough. The audio bridge 108, 208 may perform mixing, echo cancellation, filtering, compression, or other audio processing functions to create mixed audio data combining audio data from each attendee. In one embodiment, the audio bridge 108, 208 removes an attendee's own audio data from the mixed audio data heard by that attendee. In another embodiment, a viewer 100, 206 detects the playback of the stored audio data and cancels it from being sent back out on a microphone connected to the viewer 100, 206, if such a microphone is active. The audio bridge 108, 208 may be a discrete device or part of the server 106, 200, presenter 104, 204, and/or viewer 100, 206, or any other computing device capable of performing audio functions.

Audio data may also be sent via a VoIP protocol exclusively or in addition to audio data sent over the PSTN network. In this embodiment, audio mixing is performed with or without an audio bridge 108, 208. For example, each attendee may receive VoIP audio streams from each other attendee and perform mixing and echo cancellation (and/or other audio functions) locally. A mixed audio stream may be stored locally by each attendee, on the audio bridge 108, 208, and/or on a server 106, 200. Like the stored screen data described above, a late joining attendee may synchronize missed audio data with another non-late-joining device, such as the presenter 104, 204, the audio bridge 108, 208, the server 106, 200, and/or a viewer 100, 206.

Regardless of the mechanism used to transport and store the audio data, when an attendee selects screen data from an earlier point in time for playback, stored audio data from the same point in time may also be selected. With the aid of the synchronization module 116, 216, the screen and audio data may be played back simultaneously, in sync, on a viewer 100, 206 or presenter 104, 204. In one embodiment, the live audio data is reduced in volume or muted when the stored audio data is played back; alternatively or in addition, the user may manually select the volume levels of each type of audio data. In still another embodiment, the stored audio data is not played back at all. Rather, the live audio from the ongoing online meeting is played while stored screen data from the earlier point in time is displayed. Like the navigation of screen data, the navigation of audio data (or combined audio and video data) may be temporarily or permanently controlled by a single attendee for a plurality of other attendees.

Figure 5A:
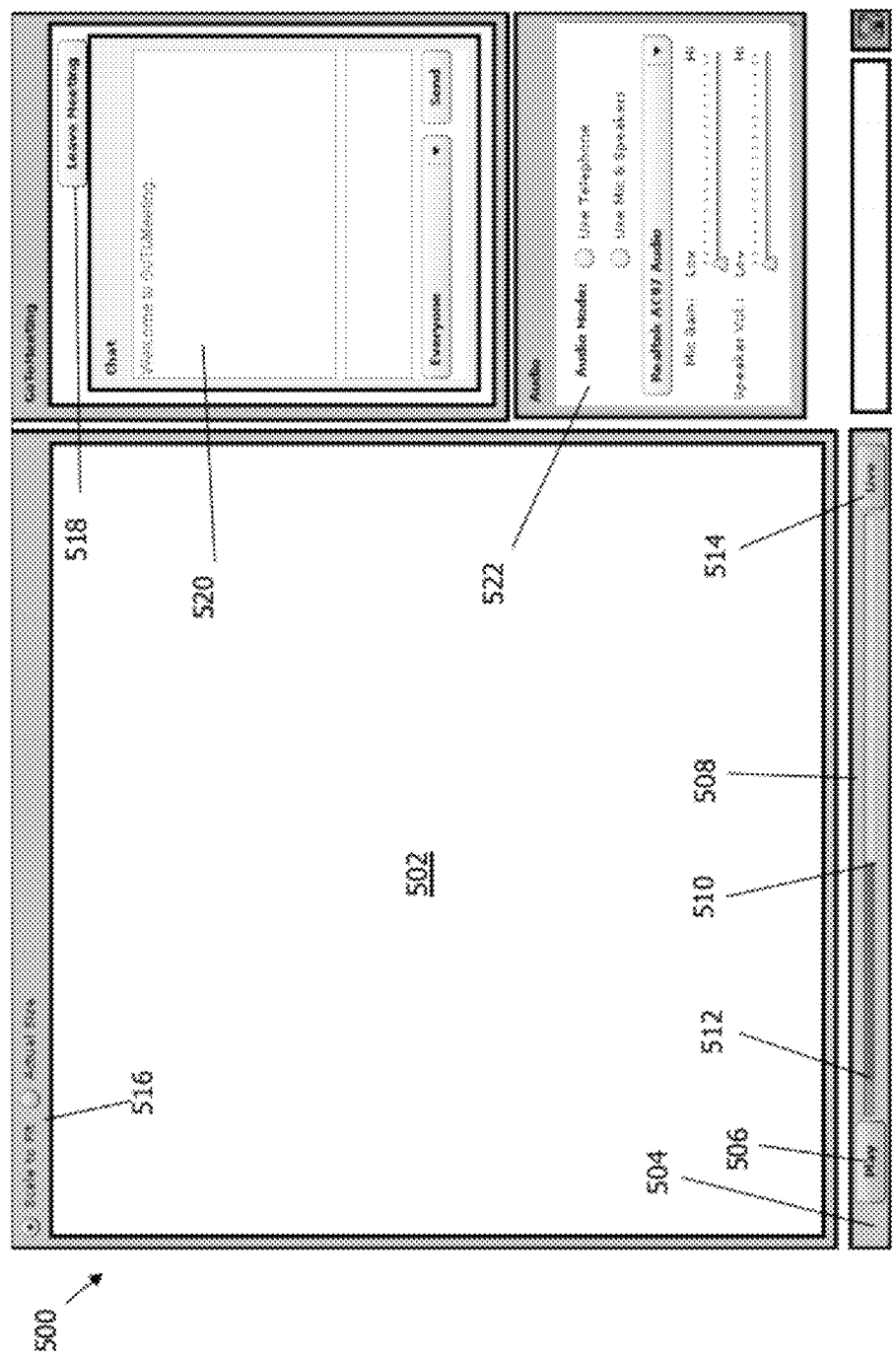
FIG. 5A is an exemplary screenshot of a user interface for viewing previously presented screen data during an ongoing online meeting in accordance with one embodiment of the invention.

FIG. 5A depicts an exemplary embodiment of a computer interface 500 for a live online meeting. A viewing window 502 may display live screen data, stored screen data, or a combination of the two. A navigation bar 504 allows a viewer 100, 206 (or a presenter 104, 204) to navigate through the stored screen data. A play/pause button 506 allows the user to play or pause the playback of the live or stored content. A multi-layer scroll bar 508 shows the user the current live point 510 in the ongoing meeting and allows the user to scroll back to an earlier point in time 512 to playback the screen data previously presented at that point in time 512. A button 514 allows the user, if currently viewing stored content in the viewing window 502, to again view live content in the viewing window 502. In other words, selecting (e.g., clicking on) the button 514 causes the viewing window 502 to display live content.

Other controls may be included in the computer interface 500. A video display mode control 516 may allow a user to view the presentation at the actual size of presentation (i.e., 1:1 scaling) or, alternatively, scaled to fit the current size of the viewing window 502 by scaling the size of the presentation up or down. An exit button 518 permits the user to leave the meeting, and a chat window 520 allows a user to send text-based messages to some or all of the other attendees of the meeting. An audio control window 522 allows the user to select between using a telephone (i.e., a PSTN connection) or a microphone and speakers (i.e., a VoIP connection), as well as to select an audio codec/hardware and to set speaker and microphone levels.

FIG. 5B depicts another exemplary embodiment of the computer interface 500 for the live online meeting. In addition to the many features illustrated in FIG. 5A, the embodiment depicted in FIG. 5B also includes a second viewing window 524 and a set of image thumbnails 526 of key screenshots generated at earlier points in time of the ongoing online meeting. The capture of the key screenshots and the generation of image thumbnails therefrom (each image thumbnail is, in one embodiment, essentially a scaled-down version of a key screenshot) is further discussed below.

As depicted in FIG. 5B, the first viewing window 502 displays stored screen data from an earlier point in time (i.e., screen data previously presented during the online meeting), while the second, picture-in-picture viewing window 524 displays live screen data for the ongoing online meeting. Alternatively, the live screen data may instead be displayed in the first viewing window 502 and the stored screen data displayed in the second, picture-in-picture viewing window 524. A user interface (e.g., a button, a pull-down menu, etc.) may also be provided to swap the contents displayed in each viewing window 502, 524.

With reference still to FIG. 5B, a second scroll bar 528 may be associated with the set of image thumbnails 526. By moving the scroll bar to the left or right, a user may navigate through the set of image thumbnails 526. As will be understood by one of ordinary skill in the art, however, the set of image thumbnails 526 may instead be displayed in other manners, including in a transparent pop-up window. In one embodiment, selecting (e.g., clicking or double clicking on) an image thumbnail 526 causes the key screenshot from which it was generated to appear in one of the viewing windows 502, 504. In the embodiment depicted in FIG. 5B, the key screenshot appears in the first viewing window 502. Data from the earlier point in time represented by that key screenshot may then be played back during the ongoing online meeting in a variety of manners. For example, the first viewing window 502 may playback therein a smooth, continuous data stream of the earlier stored screen data beginning from the point in time represented by the key screenshot/image thumbnail selected. Alternatively, rather than playing back a continuous data stream, the set of key screenshots (generated as described below) may be automatically stepped through in the first viewing window 502 beginning from the key screenshot/image thumbnail selected, thereby increasing the speed at which the user moves through the previously stored screen data. In either case, the playback of the previously stored screen data in the first viewing window 502 may occur while the online meeting is still ongoing and, for example, while live screen data continues to be displayed in the second, picture-in-picture viewing window 524. As previously mentioned live audio data may also continue to be output from the viewer computing device 100, 206 while the user reviews the earlier portions of the online meeting in the first viewing window 502.

Figure 5C:
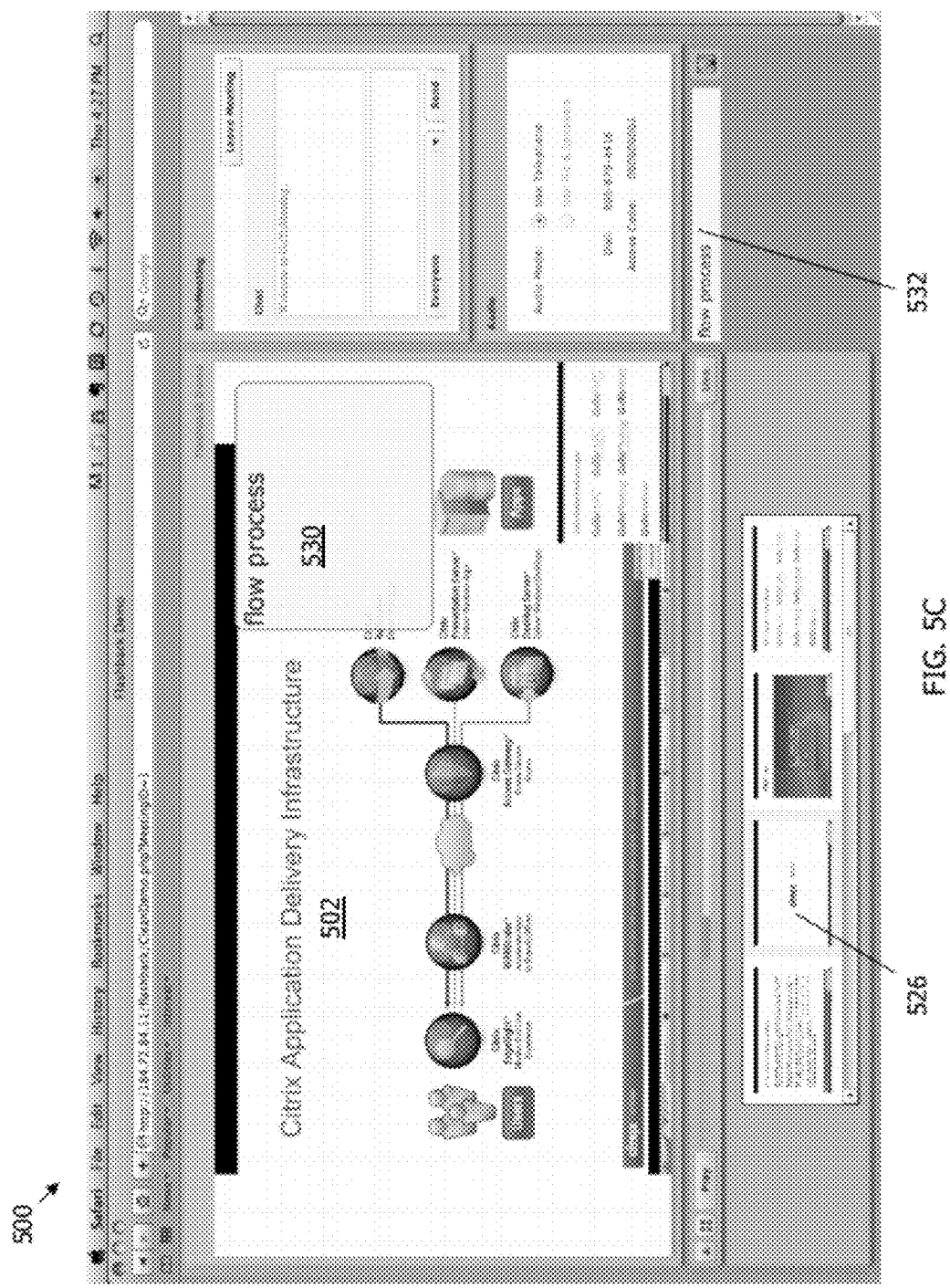
FIG. 5C is an exemplary screenshot of a user interface for viewing previously presented screen data during an ongoing online meeting in accordance with yet another embodiment of the invention.

As depicted in FIG. 5C, once an image thumbnail 526 is selected and its associated key screenshot depicted in the first viewing window 502, the key screenshot may be marked with an annotation 530 (e.g., a text-based comment). As illustrated, an input box 532 may be provided to facilitate entry of an annotation 530. Once an annotation 530 is made to a key screenshot, its associated image thumbnail 526 may be flagged (e.g., marked with a symbol) to indicate that an annotation 530 has been made. In addition, if the previously stored screen data is later played back in the first viewing window 502 (as described above), each annotation 530 made to a key screenshot may be displayed during the playback of that key screenshot (e.g., with the key screenshot when the first viewing window 502 steps through the key screenshots, or for an appropriate period of time (e.g., 3 to 5 seconds) spanning the point in time represented by the key screenshot when the first viewing window 502 plays back a smooth, continuous data stream of the earlier stored screen data). Further details on the annotations 530, and the manners in which they are handled by the systems depicted in FIGS. 1 and 2, are also described further below.

Figure 6:
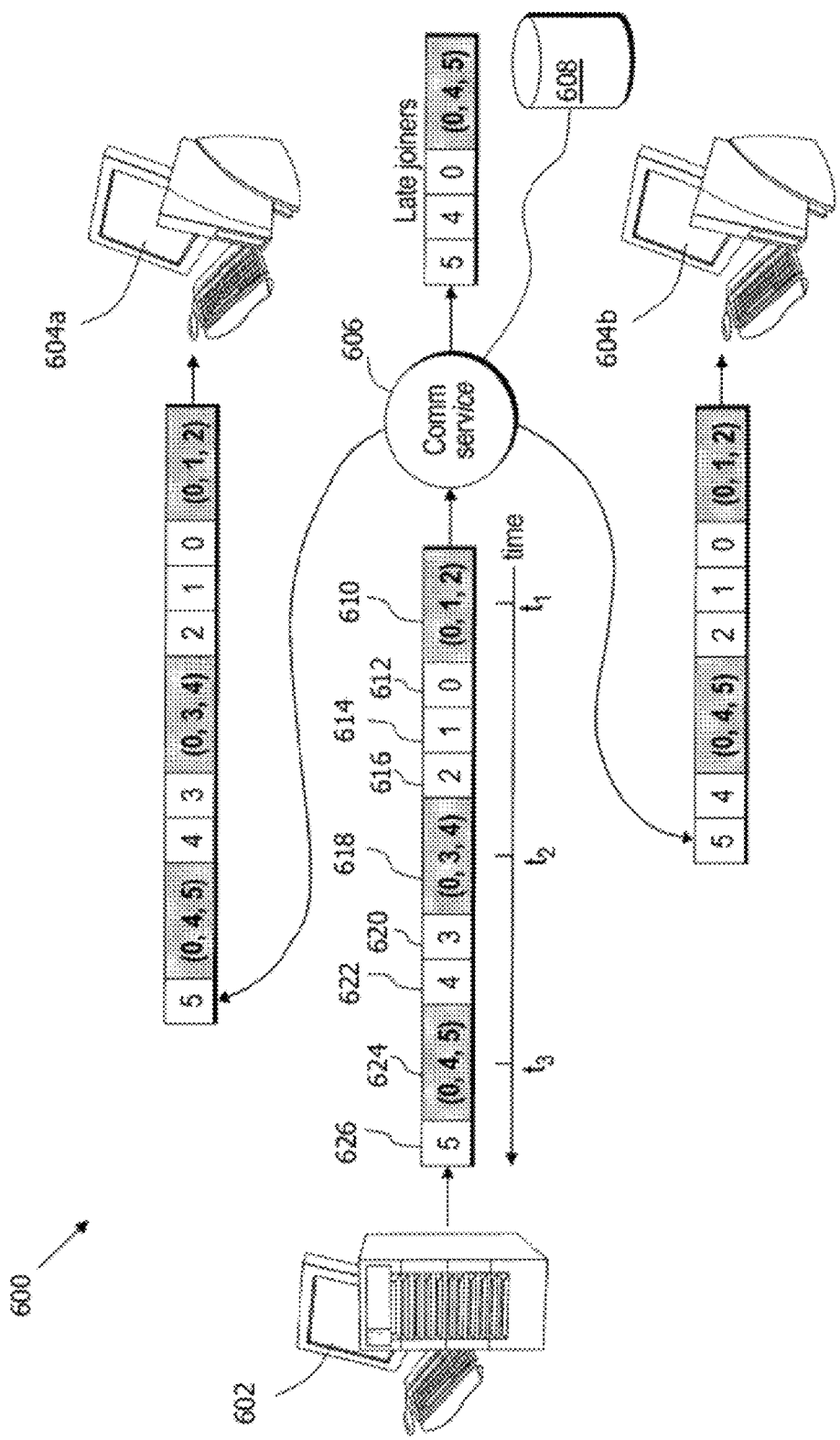
FIG. 6 is a block diagram illustrating a system for distributing screen data in a bandwidth-adaptive manner in accordance with one embodiment of the invention.

FIG. 6 depicts, in one embodiment, a system 600 for distributing screen data from a presenter 602 to viewers 604a, 604b (collectively, 604) in a bandwidth-adaptive manner. The system 600 includes a communications service 606 with which the presenter 602 and the viewers 604 communicate. In various embodiments, the communications service 606 may be provided as part of the presenter 602, the audio bridge 108, 208, the server 106, 200, and/or a viewer 604.

The presenter 602 codes the current state of a dynamic data set, such as screen data, as a set of data packets. In some embodiments, this coding process is straightforward. For example, in the case where the dynamic data set is screen data, data packets may be coded by storing pixel values for a predetermined portion of the screen in the data packet. In some embodiments, the presenter 602 compresses and/or encrypts the data stored in the data packets. As the dynamic data set changes, the presenter 602 updates the set of data packets comprising the current state of the data set.

The presenter 602 transmits the current state of the dynamic data set to the communications service 606 in a bandwidth-adaptive manner. In one embodiment, the presenter 602 possesses a transmission token before beginning transmission of the current state of the data set. In this embodiment, the presenter 602 and the communications service 606 exchange a limited number of transmission tokens, e.g., five. In other embodiments, the communication service 606 transmits a message to the presenter 602 to notify the presenter 602 when it may send another data set update.

As shown in FIG. 6, the communications service 606 may also include a data storage element 608, such as random-access memory, a disk drive, a disk array, a rewriteable optical drive, or some other form of memory element that allows access to stored data. The storage element 608 enables the communications service 606 to store metadata information and data packets received from the presenter 602 in between update requests from various viewers 604. In addition, the storage element 608 may be used to maintain a historical record of metadata information and data packets transmitted from the presenter 602. In other embodiments, the storage element 608 may also store the data packets transmitted to a respective viewer 604.

The presenter 602 creates metadata information that identifies each of the data packets representing the current state of the dynamic data set. In the embodiment shown in FIG. 6, the metadata information comprises metadata packets 610, 618, 624. Metadata packet 610 is created at time $t_1$ and indicates that the state of the dynamic data set at time $t_1$ is represented by data packet 0, data packet 1, and data packet 2. Similarly, metadata packet 618 indicates that state of the dynamic data set at time $t_2$ is represented by data packet 0, data packet 3, and data packet 4. In other embodiments, instead of creating metadata packets that store metadata information, metadata information is included in the data packets. For example, each data packet comprising a data set update may include a "metadata information header" identifying the update set with which the data packet is associated.

As shown in FIG. 6, at time $t_1$ the presenter 602 transmits metadata information 610 to the communications service 606 followed by the data packets identified by the metadata information 610, namely, data packet 0 612, data packet 1 614, and data packet 2 616. At time $t_2$, the presenter 602 transmits metadata packet 618, which indicates that the state of the data set at time $t_2$ is represented by data packet 0, data packet 3, and data packet 4. The presenter 602 then transmits data packet 3 620 and data packet 4 622 to the communications service 606 but does not retransmit data packet 0 because that data packet was already transmitted in connection with the first metadata packet 610. Similarly, at time $t_3$, the presenter 602 transmits a metadata packet 624 that indicates the current state of the dynamic data set is represented by data packet 0, data packet 4, and data packet 5. Because the presenter 602 already transmitted data packets 0 and 4, only data packet 5 626 is transmitted following the third metadata packet 624.

In FIG. 6, the viewer 604a communicates with the communications service 606 via a high-bandwidth connection. In this case, the viewer 604*a* requests data set updates frequently enough that the communication service 606 transmits to the viewer 604*a* a stream of metadata information and data packets identical to the stream of metadata information and packets received by the communications service 606 from the presenter 602. The viewer 604*b*, however, communicates with the communications service 606 via a low-bandwidth connection, and requests data set updates less frequently. Therefore, the viewer 604*b* receives a different stream of metadata packets and data packets from the communications service 606 than the communications service 606 receives from the presenter 602. More specifically, the communications service 606 transmits the first metadata packet 610 and data packets 0 612, 1 614, 2 616 to the viewer 604*b*. The next metadata packet received by the viewer 604*b* is the third metadata packet 624, which indicates that the state of the dynamic data set is represented by data packet 0, data packet 4, and data packet 5. Because the viewer 604*b* has not yet received data packets 4 and 5, the communications service 606 transmits those data packets to the viewer 604*b*.

FIG. 6 also depicts the packet stream sent to a viewer node that joins late, as described above. A late joining viewer that joins at time $t_3$, as shown in FIG. 6, receives the third metadata packet 624 as well as all the data packets identified by the third metadata packet 624. The data packets transmitted to the viewers 604*a*, 604*b* by the communications service 606 may be retrieved from the storage element 608, may have been recently received from the presenter 602, or some combination of the two.

B. Capturing Key Screenshots and Generating Image Thumbnails to Facilitate Navigation As described above, a user may navigate through previously presented screen data of a live online meeting in order to select a point in time within the previously presented screen data at which to begin playback during the live online meeting. In one embodiment, the user employs a scrollbar or a slider button, such as the scroll bar 508 described above with reference to FIG. 5A, to select the point in time. In another embodiment, image thumbnails 526 of the stored screen data are provided to the user, so that the user may select (e.g., by clicking or double clicking on) an image thumbnail 526 corresponding to a previous point in time and view the screen data associated therewith, as described above with reference to FIGS. 5B and 5C. To this end, the thumbnails 526 (and/or the key screenshots from which the thumbnails 526 are generated) may have a timestamp associated therewith. In one embodiment, the timestamp points to a point in time in the previously presented portion of the ongoing online meeting. In such a fashion, navigation of the previously presented screen data is facilitated, as the selection of an image thumbnail 526 corresponds to a selection of a particular point in time in the previously presented portion of the ongoing online meeting at which to begin viewing the previously presented screen data.

Figure 7:
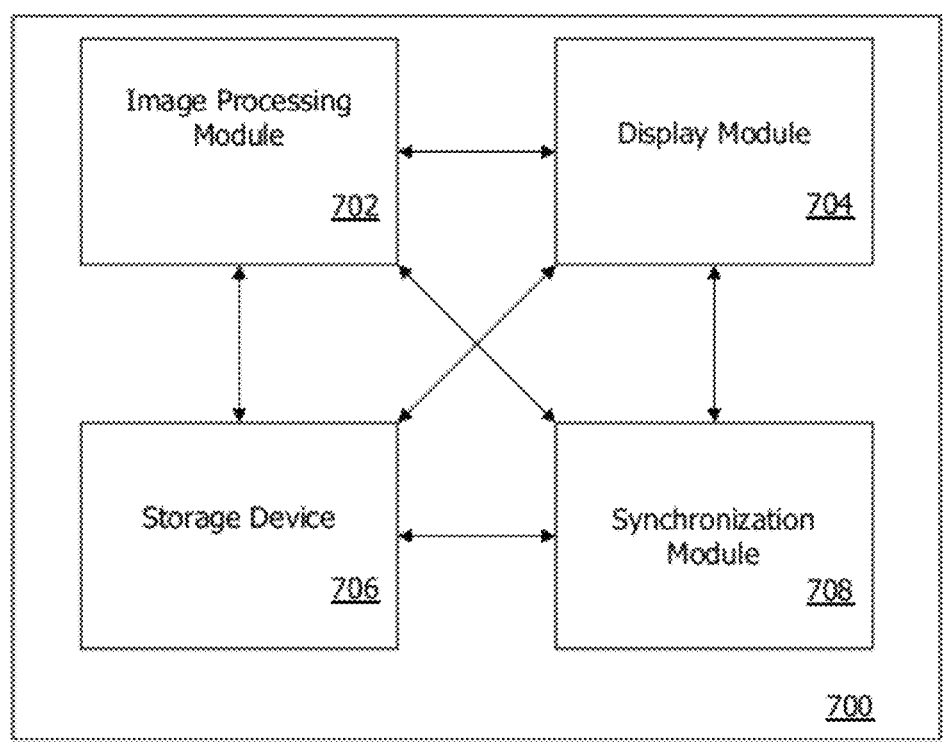
FIG. 7 is a block diagram illustrating a system for facilitating navigation of previously presented screen data in an ongoing online meeting in accordance with one embodiment of the invention.

FIG. 7 illustrates an exemplary system 700 for facilitating navigation of previously presented screen data in an ongoing online meeting. The system 700, or portions thereof, may be present, for example, on the viewer computing devices 100, 206, on the presenter computing device 104, 204, and/or on the server computing device 106, 200. In one embodiment, an image processing module 702 of the system 700 captures, in response to a trigger event, a screenshot of the screen data for the ongoing online meeting. Scaled-down versions of the screenshots (e.g., image thumbnails 526) may then be generated by the image processing module 702, and a display module 704 may cause the display of the image thumbnails 526 while the meeting is still ongoing (i.e., while live screen and/or audio data is still being presented). A storage device 706 stores the previously presented screen data, while a synchronization module 708 may be employed to transmit the image thumbnails 526 and/or the screenshots (or, as further described below, simply their timestamps) to a plurality of the viewer computing devices 100, 206.

Figure 8:
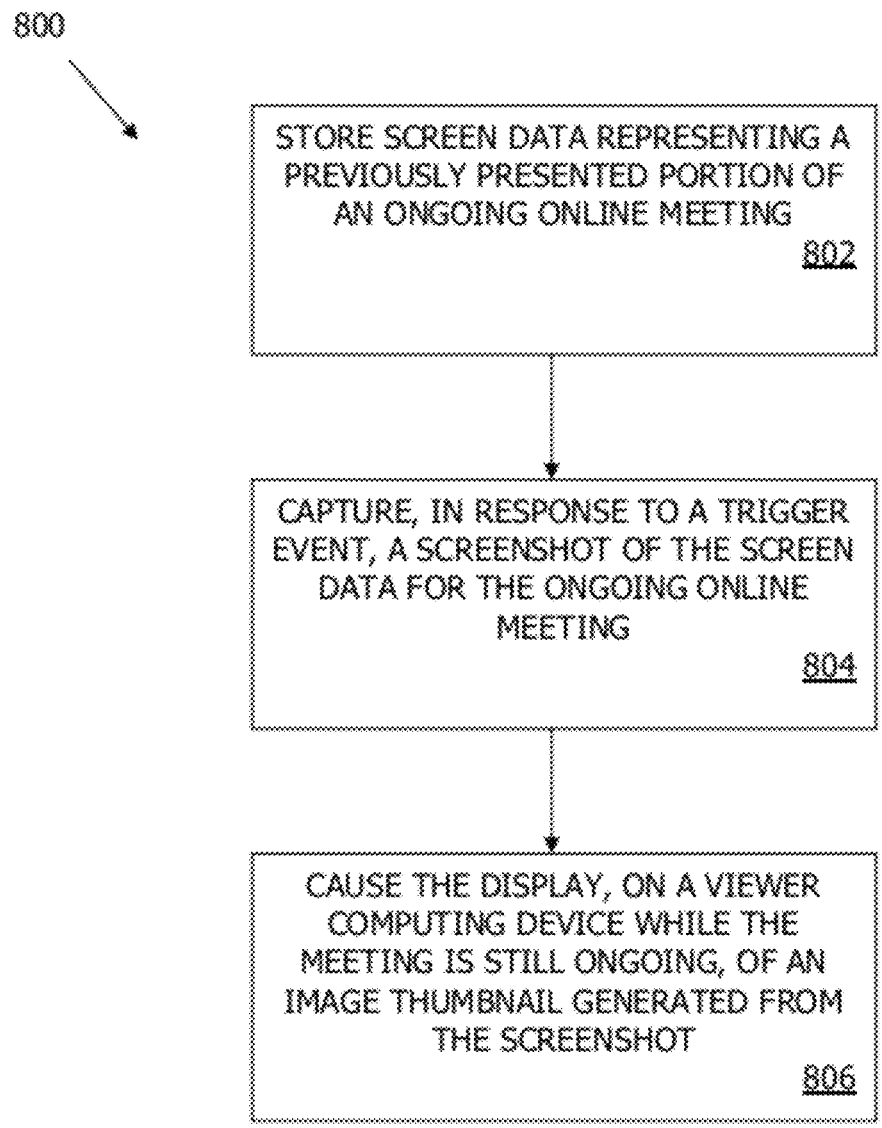
FIG. 8 is a flowchart illustrating a method for facilitating navigation of previously presented screen data in an ongoing online meeting in accordance with one embodiment of the invention.

FIG. 8 illustrates one embodiment of a method 800 for facilitating navigation of previously presented screen data in an ongoing online meeting by using, for example, the system 700 depicted in FIG. 7. In greater detail, a portion of screen data representing a previously presented portion of an ongoing online meeting is stored in the storage device 706 (Step 802). A screenshot of the screen data for the ongoing online meeting is captured by the image processing module 702 in response to a trigger event (Step 804). The display module 704 may then cause an image thumbnail 526 generated from the screenshot to be displayed on a viewer computing device 100, 206 (Step 806) while the meeting is still ongoing (i.e., while live screen and/or audio data is still being presented). For example, where the system 700 is resident on a viewer computing device 100, 206, the display module 704 may simply display the generated image thumbnail 526 thereat. On the other hand, where the system 700 is resident on the presenter computing device 104, 204 or on the server computing device 106, 200, the display module 704 may instruct the synchronization module 708 to transmit the screenshot to one or more viewer computing devices 100, 206, together with instructions to display an associated image thumbnail 526 thereat. Alternatively, the display module 704 may instruct the synchronization module 708 to transmit the image thumbnail 526 (with or without its associated screenshot) to one or more viewer computing devices 100, 206, together with instructions to display the image thumbnail 526 thereat. Regardless of how the image thumbnail 526 is caused to be displayed on the viewer computing device 100, 206, the image thumbnail 526, as described herein, facilitates navigation on the viewer computing device 100, 206 of the previously presented portion of the online meeting while the meeting is still ongoing.

As previously mentioned, in one embodiment, the image thumbnail 526 is a scaled-down-in-size version the presenter's screen data at a particular point in time. The image thumbnail 526 may be small in size (e.g., 50×50 pixels), large (e.g., 300×300 pixels), or any other appropriate size. Any suitable image format or compression type may be used (e.g., BMP, JPG, PNG, or GIF). The quality of the image thumbnails 526 may be tuned for less processing time (i.e., for lower-quality thumbnails 526) or more processing time (i.e., for higher-quality thumbnails 526).

The screenshot, from which the image thumbnail 526 is generated, is taken when a trigger event occurs. In one embodiment, the trigger event occurs at regular time intervals (e.g., periodically, after the passage of a pre-determined period of time). In another embodiment, the trigger event occurs when a difference between the stored screen data and the live screen data increases past a threshold. For example, the pixels in the last screenshot captured may be compared to the pixels in the live screen data, and if the number of pixels that are different increase past a threshold (e.g., 5%, 10%, or 25% differing pixels), a trigger event occurs and a new screenshot is captured. This new screenshot, in turn, may compared to the live screen data to determine when the next trigger event occurs. In yet another embodiment, the locations of pixels in the live screen data that are different from corresponding pixels in the last screenshot captured are noted, and a trigger even occurs when a bounding box containing all of the differing pixels increases past a threshold (e.g., a maximum area, perimeter, or diagonal size). In still another embodiment, each of the last screenshot and the live screen data is represented by an arrangement (e.g., array) of tiles, and a trigger event occurs when a number of tiles that include a pixel in the last screenshot that is different from a corresponding pixel in the live screen data increases past a threshold (e.g., 5%, 10%, 25%, or 50% of the tiles).

In one embodiment, a first screenshot is automatically generated at the beginning of the presentation. This screenshot may serve as the first basis of comparison for trigger events that rely on, in part, detecting a change in live screen data versus a stored screenshot.

The trigger event may also be an operating system event, such as a mouse click, a key press, a change in an active window, or a change in the title of an active window. In another embodiment, the trigger event is an application event, such as a slide transition or an opening of a new file. The presenter 104, 204 may also include a user interface for manually causing a trigger event.

If too much time has passed since the last trigger event, a new trigger event may be automatically generated. If the new trigger event produces a new screenshot substantially similar to the last screenshot, the new screenshot may be stamped with a distinguishing feature (e.g., a numeral "II" or the time index of its capture in the online presentation) to aid in distinguishing the screenshots.

On the other hand, trigger events may occur too quickly, causing extra processing resources to be consumed to capture the screenshots and generate the thumbnails 526 therefrom, causing increased network traffic to distribute the screenshots and/or thumbnails 526, and making navigation through the resulting large set of thumbnails 526 more difficult. Accordingly, in one embodiment, if a second trigger event occurs too soon after a first trigger event, the image processing module 702 suppresses the second trigger event and no screenshot is captured or thumbnail 526 generated. A suppressed trigger event may automatically capture a screenshot and generate a thumbnail after a suitable delay (e.g., 30, 60, or 90 seconds). Trigger events may also be suppressed when, for example, the live presentation contains video or animation, causing the screen to change frequently. In one embodiment, if the presence of video in the presentation is detected, any pixel changes associated therewith are ignored for the purposes of computing a trigger event. In another embodiment, if the presence of video in the presentation is detected, the image processing module 702 switches from using a first trigger (e.g., the number of pixels that have changed increasing past a threshold) to using a second trigger (e.g., one based on the passage of time).

As will be understood by one of ordinary skill in the art, the trigger events may take any form, depending upon the particular application. In addition to the trigger events discussed above, further exemplary trigger events include, but are not limited to: beginning execution of a new program; terminating a program, observing a change in the behavior of an executing program, a change in the state of an executing program, a change of foreground application, or a change of application focus; a program transitioning to or from execution in a full-screen mode; the creation, display, change, or destruction of a user interface element; and opening, closing, or changing an existing file.

The set of screenshots that are generated in response to the trigger events (i.e., the "key screenshots") may be compiled by the image processing module 702 into a meeting digest (e.g., a list of key screenshots). Moreover, as previously explained, the image processing module 702 may associate a timestamp with each of the key screenshots and the thumbnails 526 generated therefrom in order to facilitate navigation of the previously presented screen data.

In one embodiment, the live presentation contains slides, and a trigger event occurs when a new slide is presented. Thus, each resulting thumbnail 526 may correspond to a different slide in the presentation, and a user may easily navigate through the presentation by navigating through the slide thumbnails 526. If the presentation dwells on a certain slide for a length of time greater than a threshold (e.g., three, five, or ten minutes), more than one thumbnail 526 may be generated for that slide (with a unique identifier possibly being stamped on each thumbnail 526) so that a user may navigate within the audio data associated for that slide. In general, as previously discussed, navigating the stored screen data by selecting a generated thumbnail 526 may cause the playback of the associated stored screen data as well as the associated audio data.

In one embodiment, a viewer computing device, such as the viewers 100, 206 described above, generates its own key screenshots and thumbnails 526. In other embodiments, the key screenshots and thumbnails 526 are generated by a presenter 104, 204, a server 106, 200, and/or another viewer 100, 206. Because each viewer may receive a different set of screen updates, as explained above with reference to the bandwidth-adaptive distribution of screen updates shown in FIG. 6, each viewer may generate a set of key screenshots and thumbnails 526 different from each other viewer (and from the presenter). In one embodiment, the attendee that received the most frequent updates (e.g., the presenter, server, or a viewer with a fast connection) determines the set of key screenshots and thumbnails 526 to be used by all attendees (i.e., a canonical set of key screenshots and thumbnails 526), and the canonical set of key screenshots and/or thumbnails 526 are distributed to the rest of the attendees. In another embodiment, the synchronization module 708 analyzes screenshots or thumbnails 526 generated by a plurality of attendees and merges them into a set of canonical screenshots or thumbnails 526 for distribution. For example, if two screenshots generated by different attendees differ in time by only a few seconds, the synchronization module 708 may chose one screenshot and discard the other. If there is a large gap in time between two screenshots generated by a single attendee, however, the synchronization module 708 may insert a third screenshot, generated by another attendee, between the screenshots in creating the canonical set of screenshots.

If a canonical set of screenshots and/or thumbnails 526 is distributed, it may be done at regular intervals throughout the meeting, at the end of the meeting, or whenever an identified attendee (e.g., the presenter) captures a new screenshot and/or generates a new thumbnail 526 (or otherwise determines that an update is necessary). In one embodiment, when an attendee assumes navigational control of one or more other attendees (as described above), a screenshot and/or thumbnail 526 used by the controlling attendee is distributed to the controlled attendees along with the distributed navigational commands.

A late joining attendee, as described above, may receive some or all of the stored screen data representing the missed portion of the online meeting from the presenter, server, or another viewer. The late joining attendee may also receive screenshots and/or thumbnails 526 generated by another attendee or by the server corresponding to the stored screen data. The stored screen data, and the screenshots and/or thumbnails 526, may come from the same source or from separate sources. In one embodiment, the late joining attendee receives one or more canonical screenshots and/or thumbnails 526 from the server or a designated attendee; in another embodiment, the late joining attendee receives non-canonical screenshots and/or thumbnails 526 from any attendee, and the non-canonical screenshots and/or thumbnails 526 are merged later (along with other attendees' screenshots and/or thumbnails 526).

In yet another alternative, rather than distributing screenshots and/or thumbnails 526, it may suffice simply to distribute their associated timestamps. For example, where previously presented screen data is stored on the viewer computing devices, distributing simply the timestamps thereto (e.g., a canonical set of timestamps) allows the viewer computing device to itself search the stored screen data, and capture and generate key screenshots and associated image thumbnails 526 (e.g., a canonical set of key screenshots and associated image thumbnails 526).

C. Annotating Key Screenshots

Figure 9:
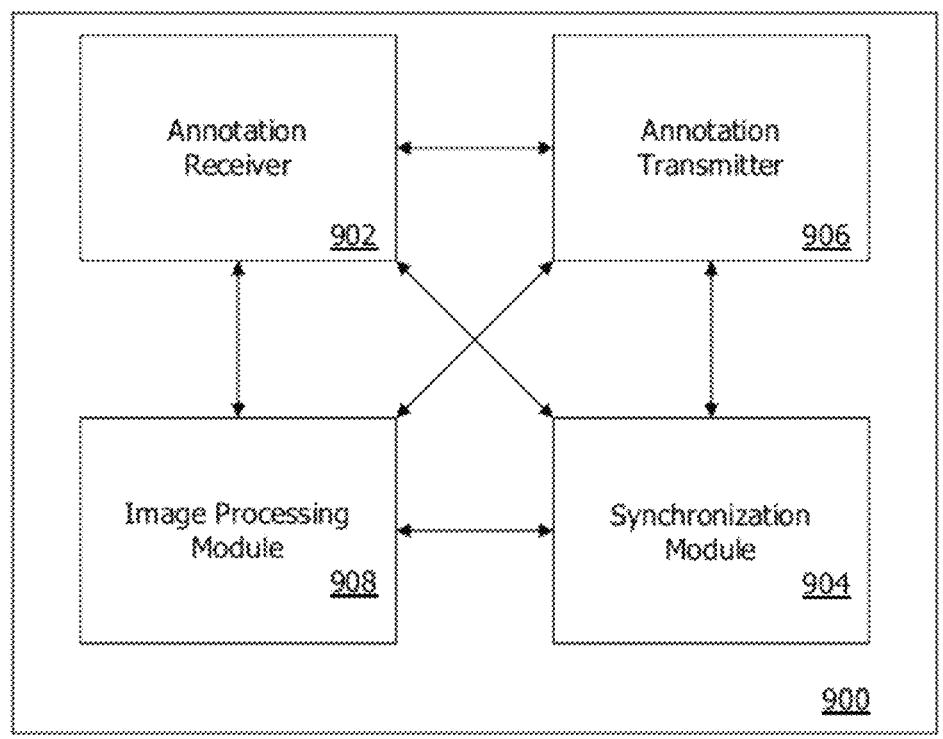
FIG. 9 is a block diagram illustrating a system for sharing annotations during a live online meeting in accordance with one embodiment of the invention.

FIG. 9 illustrates an exemplary system 900 for sharing an annotation to a key screenshot during an ongoing online meeting. Typically, the system 900 is present on the server computing device 106, 200, although it may instead be present on, for example, a viewer computing device 100, 206 or the presenter computing device 104, 204. The annotation to the key screenshot may be text, symbols, or figures drawn using a mouse or other pointing device, typewritten text or symbols, an image, or any other visual data. The annotation may be added to white or free space in the key screenshot or may be drawn over objects appearing in the key screenshot. In various embodiments, the annotation is made in a different color, highlighting, shading, or transparency level than the objects appearing in the key screenshot. In one embodiment, the annotation is tagged with information identifying its author, time of creation, and/or time of last editing.

With reference still to FIG. 9, an annotation receiver 902 receives the annotation to the key screenshot, which represents a previously presented portion of the online meeting. The annotation may be transmitted from a first computing device participating in the online meeting. For example, the annotation may be transmitted from a viewer computing device 100, 206 to the server 106, 200, or from a presenter computing device 104, 204 to the server 106, 200. A synchronization module 904 may then identify a second computing device also participating in the online meeting that has not received the annotation, and an annotation transmitter 906 may transmit the annotation to the second computing device for display thereat during the ongoing online meeting. The system 900 may also include an image processing module 908 for capturing a plurality of screenshots that each represent a previously presented portion of the online meeting and for generating image thumbnails therefrom, as described above. The transmitter 906 may also transmit the plurality of screenshots and/or image thumbnails (or simply their timestamps) to the first and second computing devices.

Figure 10:
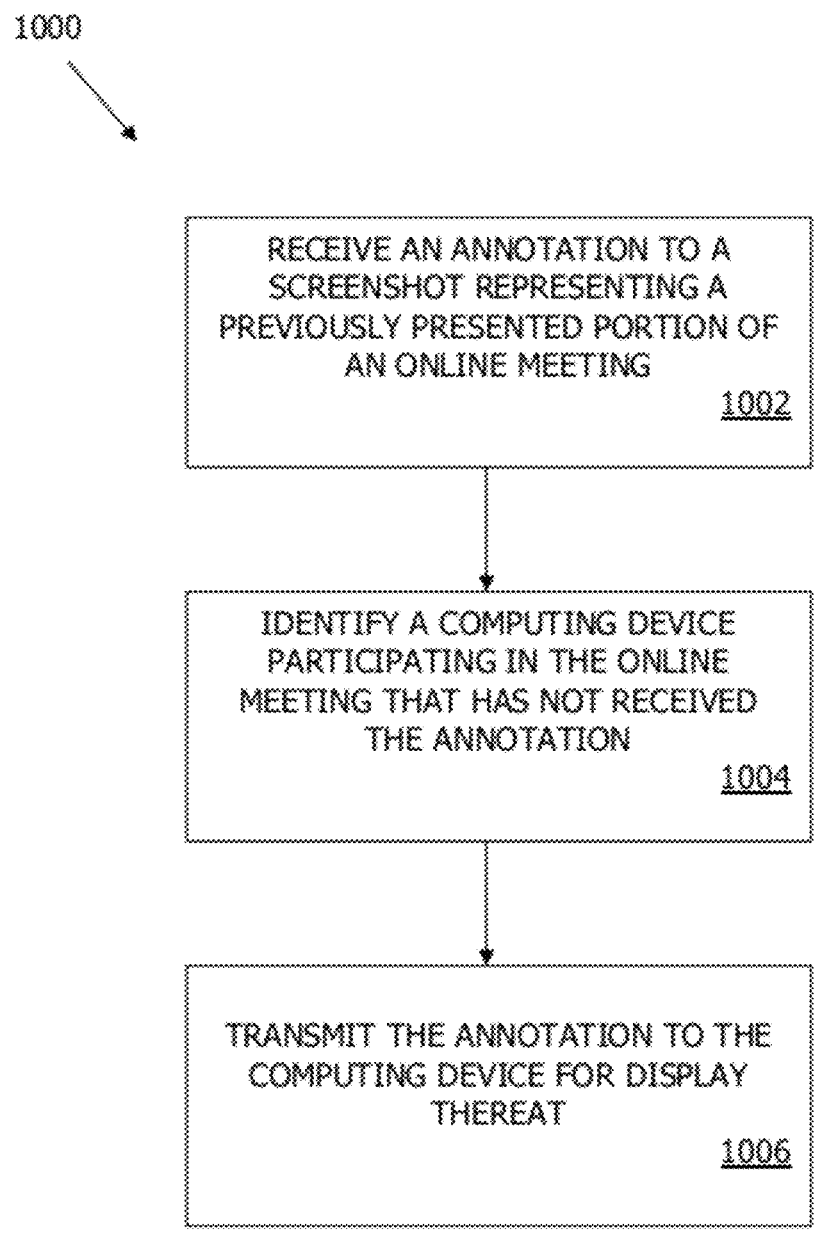
FIG. 10 is a flowchart illustrating a method for sharing annotations during a live online meeting in accordance with one embodiment of the invention.

FIG. 10 illustrates one embodiment of a method 1000 for sharing an annotation to a key screenshot during an ongoing online meeting by using, for example, the system 900 depicted in FIG. 9. As illustrated, the method 1000 begins by receiving, at the server computing device 106, 200 from a first computing device participating in the online meeting, an annotation to a key screenshot representing a previously presented portion of the online meeting (Step 1002). A second computing device participating in the online meeting but that has not received the annotation is then identified by the synchronization module 904 (Step 1004). The annotation is then transmitted from the server computing device 106, 200 to the second computing device for display thereat during the ongoing online meeting (Step 1006).

In this way, attendees to the ongoing online meeting may share annotations to the key screenshots. For example, a first attendee may wish to make an annotation to a particular screenshot (corresponding to, e.g., a particular slide in a presentation). The first attendee makes the annotation, and the annotation may be distributed by the server 106, 200 to some or all of the other attendees. Another attendee may wish to augment or correct the annotation, in which case the updated annotation may be re-distributed by the server 106, 200 to the rest of the attendees (including the first attendee). The other attendees may also choose to make annotations to other, unannotated screenshots, and these other annotations may also be distributed.

In another embodiment, a user makes a private annotation to a screenshot. The user may designate a particular annotation as private or may specify that all of the user's annotations are to be kept private. In one embodiment, the user may make private and public annotations to the same screenshot. The private annotations may be designated by, for example, a different color or tag to distinguish them from public annotations. In one embodiment, the presenter or a designated viewer may specify that all annotations in a meeting are to remain private. In another embodiment, annotations may be shared between only a designated subgroup of attendees.

In one embodiment, the annotation is made to a screenshot that has already been determined to be a meeting-wide, agreed-upon screenshot (i.e., a canonical screenshot, as described above). In this embodiment, an attendee receiving the annotation adds or merges the annotation to the attendee's copy of the screenshot. In another embodiment, each attendee may have a different set of screenshots and thumbnails 526 because, for example, different attendees received different screen data, as described above with reference to FIG. 6. In this embodiment, if an attendee distributes or receives an annotation to a screenshot that other attendees do not possess, the screenshot associated with that annotation may, at that point, be synchronized across some or all attendees (by, for example, the synchronization module 904). For example, if an attendee possesses a screenshot corresponding to a point close in time to the annotated screenshot (within, e.g., 5, 10, or 30 seconds), the unannotated screenshot may be replaced in favor of the annotated screenshot. If both screenshots possess annotations, the annotations may be merged together and applied to one of the screenshots, and the other screenshot deleted. In other embodiments, the annotations and screenshots may be synchronized only at or near the end of the online meeting.

As mentioned, the system 900 may be present on the server 106, 200, the presenter 104, 204, or a viewer 100, 206. Alternatively, the system 900 may have its components divided among two or more of the server 106, 206, the presenter 104, 204, and/or the viewers 100, 206. In one embodiment, the system 900 stores the annotations for the attendees, and each new or edited annotation is reflected in the copy stored by the system 900. The system 900 may also generate and store the screenshots and/or image thumbnails 526 for the online presentation, as described above.

The online meeting, screenshots and/or thumbnails 526 (or simply their associated timestamps), and annotations may be transmitted over different communications channels. For example, the bandwidth needs of transmitting the online meeting may be greater than the needs of the screenshots or annotations, so the online meeting may be transmitted over its own, more robust channel. The screenshots and annotations, on the other hand, may require comparatively less bandwidth, and so may be sent on lower-bandwidth channels. In one embodiment, the channels carrying the screenshots and annotations have low latency so that a captured screenshot or annotation thereto may be quickly distributed across attendees. The channels carrying the screenshots and annotations may be encrypted for security purposes.

D. Summary Document Generation Using Key Screenshots

Figure 11:
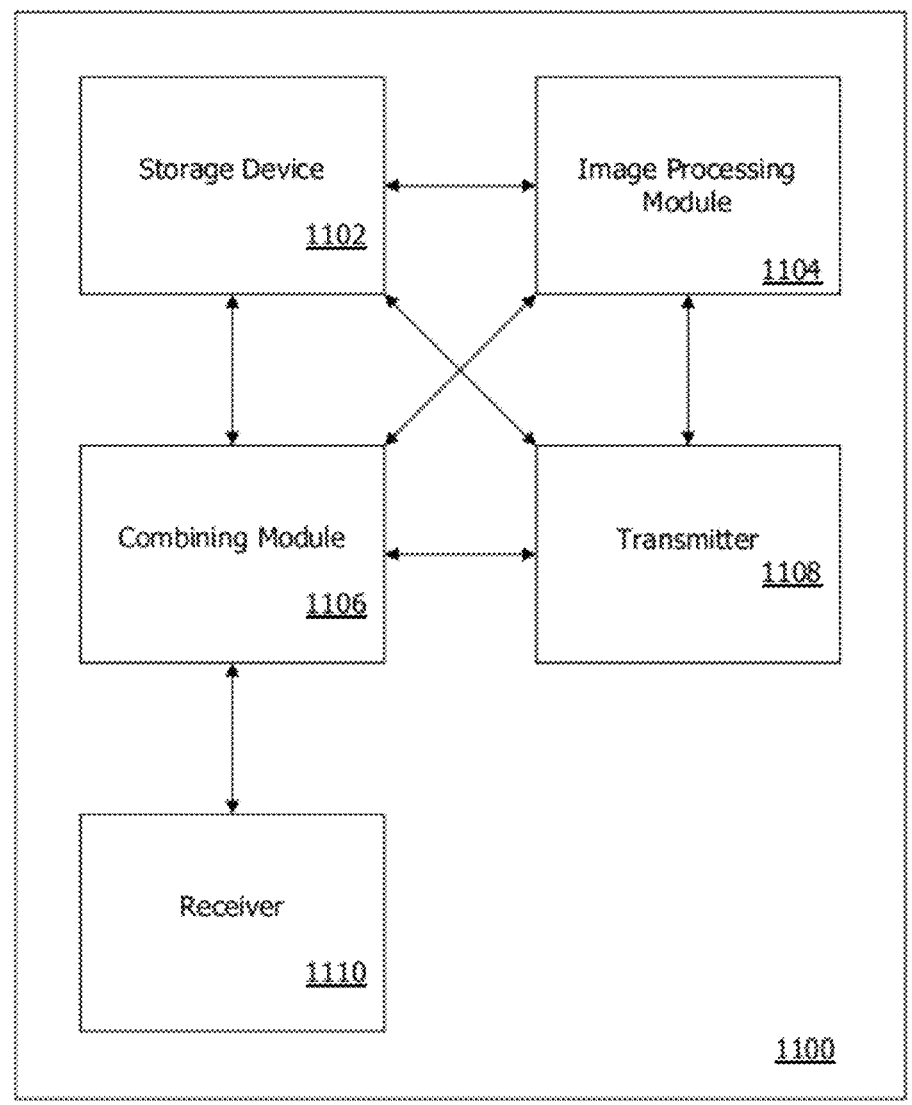
FIG. 11 is a block diagram illustrating a system for generating a summary document of a live online meeting in accordance with one embodiment of the invention.

FIG. 11 illustrates an exemplary system 1100 for generating a summary document of an online meeting. Again, the system 1100, or a portion thereof, may be present, for example, on the viewer computing devices 100, 206, on the presenter computing device 104, 204, and/or on the server computing device 106, 200. A storage device 1102 (e.g., computer memory) stores at least a portion of screen data representing a previously presented portion of the online meeting. An image processing module 1104 captures a plurality of key screenshots in response to trigger events, as described above. A combining module 1106 generates a summary document summarizing the online meeting by combining the plurality of screenshots. Optionally, the system 1100 may further include a receiver 1110 for receiving an annotation from a computing device attending the meeting, and the combining module 1106 may further add the annotation to the summary document.

Figure 12:
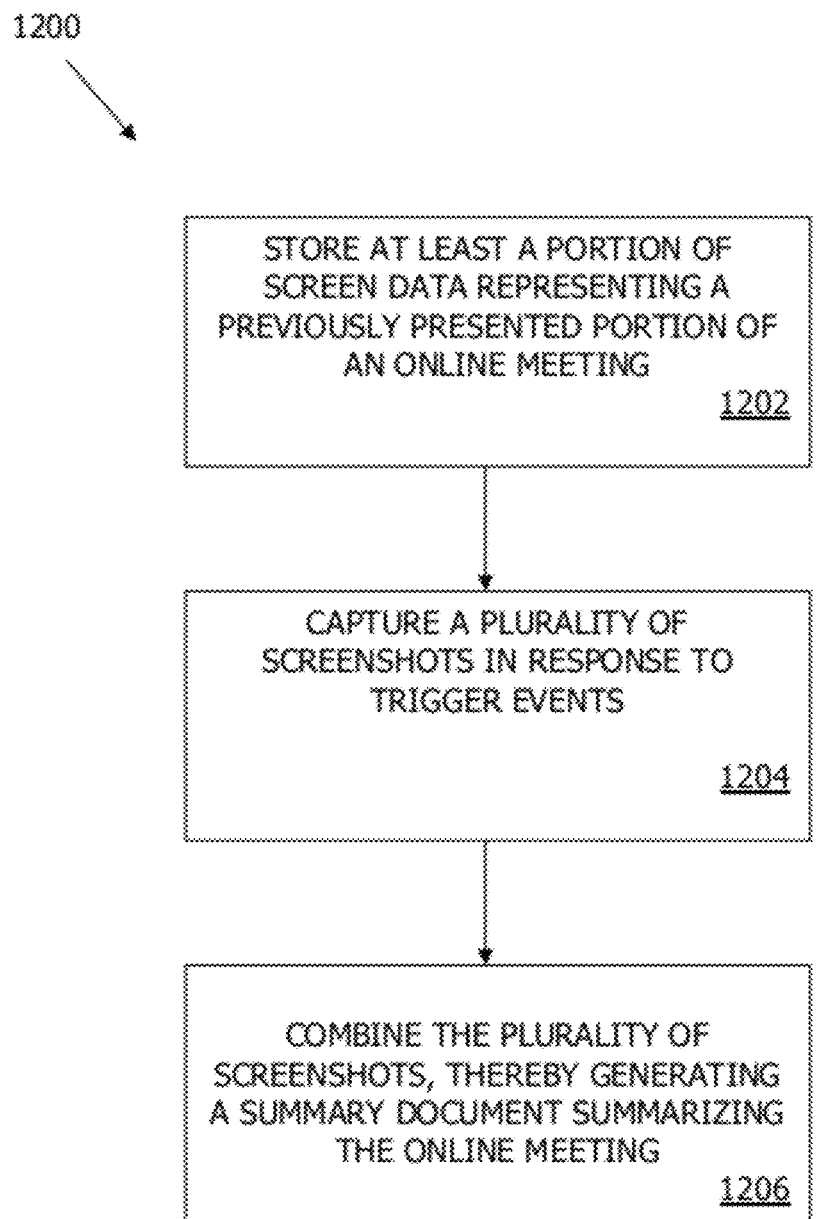
FIG. 12 is a flowchart illustrating a method for generating a summary document of a live online meeting in accordance with one embodiment of the invention.

FIG. 12 illustrates one embodiment of a method 1200 for generating a summary document of an online meeting by using, for example, the system 1100 depicted in FIG. 11. As illustrated, the method 1200 begins by storing at least a portion of screen data representing a previously presented portion of an online meeting in the storage device 1102 (Step 1202). A plurality of key screenshots are captured by the image processing module 1104 in response to trigger events (Step 1204), as described above. At some later point in time, the plurality of screenshots are combined by the combining module 1106 to generate a summary document summarizing the online meeting (Step 1206).

In one embodiment, the summary document is a single- or multi-page electronic document containing embedded images representing the key screenshots. For example, the summary document may be a MICROSOFT WORD document, an OPENOFFICE.ORG WRITER document, an ADOBE PDF, an HTML page, or any other available document format. In one embodiment, the summary document includes information about the date, time, and nature of the online meeting and a list of its attendees. The summary document may also include information about the date and time of the creation of each screenshot and/or the elapsed time in the online presentation corresponding to the screenshot. In one embodiment, the summary document contains a link to a saved version of the online presentation; in another embodiment, the summary document contains a link for each screenshot corresponding to the screenshot's location within the online presentation.

Figure 13:
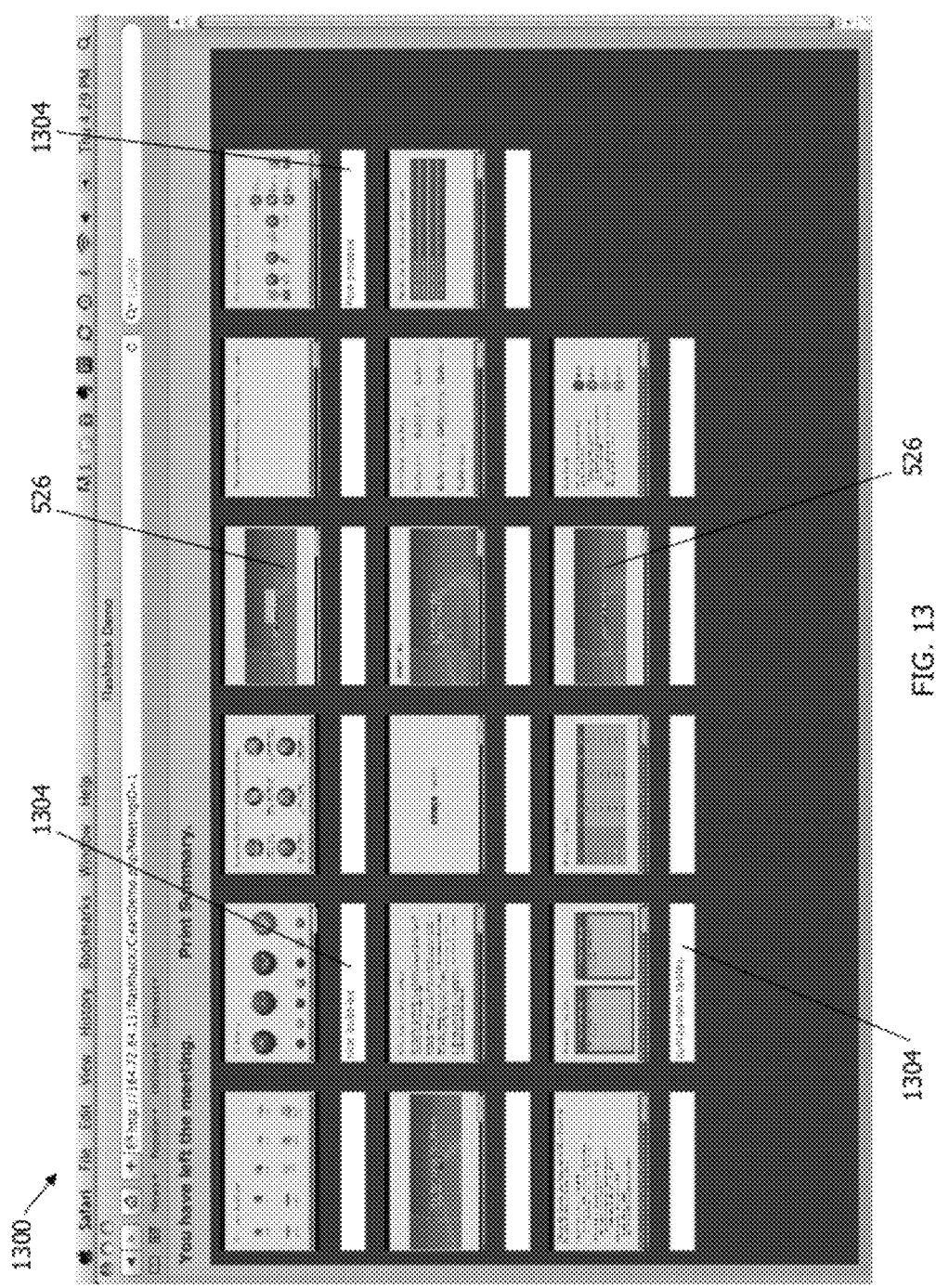
FIG. 13 is an exemplary summary document of a live online meeting generated in accordance with one embodiment of the invention.

In one embodiment, the summary document contains some or all of the annotations made during the online meeting. The annotations may be displayed on the screenshots or, if the annotations are textual, they may be displayed under, over, or next to the screenshots as optical-character recognition text. The summary document may indicate the author of each annotation. FIG. 13 depicts one exemplary summary document 1300, which includes a plurality of screenshots 526 and corresponding annotations 1304.

In one embodiment, a single summary document is generated and then distributed by a transmitter 1108 to all meeting attendees. In another embodiment, the transmitter 1108 distributes the single summary document to only a subset of the attendees, such as only to the presenter. An attendee may choose to make private annotations to the key screenshots, and to generate a private summary document containing only those annotations and/or any public annotations made by other attendees.

The annotations, screenshots, and/or summary document may be encrypted if, for example, the information contained in the presentation is sensitive. To improve security, the summary document may only be generated by a meeting attendee (e.g., a presenter 104, 204 or a viewer 100, 206). In other embodiments, the annotations, screenshots, and/or summary document are not encrypted, and the summary document may additionally or alternatively be generated by the server 106, 200, which is able to read and manipulate the unencrypted contents.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for generating a summary document of an online meeting, the method comprising:

storing, in computer memory, at least a portion of screen data representing a previously presented portion of an ongoing online meeting;

capturing a plurality of screenshots in response to trigger events, each screenshot i) being based at least in part on the stored screen data and ii) being representable as an image thumbnail, wherein capturing each screenshot of the screen data includes associating a timestamp with the screenshot, the timestamp indicating a point in time in the previously presented portion of the meeting;

combining the plurality of screenshots, thereby dynamically generating a summary document summarizing the ongoing online meeting, wherein the image thumbnails representing the plurality of screenshots are for facilitating navigating through the summary document while the ongoing online meeting is still ongoing; and signaling for presenting, at a viewer computing device attending the meeting, simultaneously and while the ongoing online meeting is still ongoing, first screen data corresponding to a currently presented portion of the ongoing online meeting and second screen data corresponding to one of the plurality of screenshots in the summary document, wherein the second screen data includes stored screen data from a previously presented portion of the ongoing online meeting, and wherein the first screen data is presented picture-in-picture inside the second screen data or the second screen data is presented picture-in-picture inside the first screen data, wherein signaling for presenting the first screen data corresponding to the currently presented portion of the ongoing online meeting includes presenting live screen and audio data of the ongoing online meeting, and wherein signaling for presenting the second screen data corresponding to the screenshot includes displaying screen data from the previously presented portion of the online meeting corresponding to the point in time in the previously presented portion of the meeting indicated by the timestamp associated with the one of the plurality of screenshots in the summary document.

2. The method of claim 1, further comprising:
transmitting the summary document to the viewer computing device attending the meeting.

3. The method of claim 1, further comprising:
receiving an annotation from the viewer computing device attending the meeting; and
adding the annotation to the summary document.

4. The method of claim 3, wherein the annotation is encrypted.

5. The method of claim 3, wherein the annotation is unencrypted.

6. The method of claim 1, wherein the summary document is generated by a server computing device.

7. The method of claim 1, wherein the summary document is generated by the viewer computing device.

8. The method of claim 1, wherein at least one of the plurality of screenshots is encrypted.

9. The method of claim 1, further comprising:
capturing an additional screenshot after generating the summary document; and
adding the additional screenshot to the summary document.

10. The method of claim 1, further comprising:
signaling for providing, at the viewer computing device attending the meeting, a user interface element for selecting whether the first screen data is presented picture-in-picture inside the second screen data or the second screen data is presented picture-in-picture inside the first screen data.

11. The method of claim 1, wherein combining the plurality of screenshots further comprises storing, in the summary document, an elapsed time occurring in the online meeting corresponding to each of the plurality of screenshots.

12. A system for generating a summary document of an online meeting, the system comprising:
at least one processor;
a non-transitory computer readable memory, the computer readable memory storing at least a portion of screen data representing a previously presented portion of an ongoing online meeting, and further storing program code for, when executed on the processor, generating the summary document of the online meeting, the program code comprising:
image processing program code for capturing a plurality of screenshots in response to trigger events, each screenshot i) being based at least in part on the stored screen data and ii) being representable as an image thumbnail, wherein capturing each screenshot of the screen data includes associating a timestamp with the screenshot, the timestamp indicating a point in time in the previously presented portion of the meeting;
combining program code for combining the plurality of screenshots, thereby dynamically generating a summary document summarizing the ongoing online meeting, wherein the image thumbnails representing the plurality of screenshots are for facilitating navigating through the summary document while the ongoing online meeting is still ongoing; and
presenting program code for signaling for presenting, at a viewer computing device attending the meeting, simultaneously and while the ongoing online meeting is still ongoing, first screen data corresponding to a currently presented portion of the ongoing online meeting and second screen data corresponding to one of the plurality of screenshots in the summary document, wherein the second screen data includes stored screen data from a previously presented portion of the ongoing online meeting, and wherein the first screen data is presented picture-in-picture inside the second screen data or the second screen data is presented picture-in-picture inside the first screen data, wherein signaling for presenting the first screen data corresponding to the currently presented portion of the ongoing online meeting includes presenting live screen and audio data of the ongoing online meeting, and wherein signaling for presenting the second screen data corresponding to the screenshot includes displaying screen data from the previously presented portion of the online meeting corresponding to the point in time in the previously presented portion of the meeting indicated by the timestamp associated with the one of the plurality of screenshots in the summary document.

13. The system of claim 12, further comprising a transmitter for transmitting the summary document to the viewer computing device attending the meeting.

14. The system of claim 12, further comprising a receiver for receiving an annotation from the viewer computing device attending the meeting, and wherein the combining program code further, when executed on the processor, adds the annotation to the summary document.

15. The system of claim 14, wherein the annotation is encrypted.

16. The system of claim 14, wherein the annotation is unencrypted.

17. The system of claim 12, wherein at least one of the plurality of screenshots is encrypted.

18. A non-transitory computer-readable medium comprising computer-readable instructions thereon for generating a summary document of an online meeting, the computer-readable medium comprising:
instructions to store, in computer memory, at least a portion of screen data representing a previously presented portion of an ongoing online meeting;
instructions to capture a plurality of screenshots in response to trigger events, each screenshot i) being based at least in part on the stored screen data and ii) being representable as an image thumbnail, and wherein the instructions to capture the plurality of screenshots are operable to capture each screenshot of the screen data by, at least in part, associating a timestamp with the screenshot, the timestamp indicating a point in time in the previously presented portion of the meeting;
instructions to combine the plurality of screenshots, thereby dynamically generating a summary document summarizing the ongoing online meeting, wherein the image thumbnails representing the plurality of screenshots are for facilitating navigating through the summary document while the ongoing online meeting is still ongoing; and instructions to signal for presenting, at a viewer computing device attending the meeting, simultaneously and while the ongoing online meeting is still ongoing, first screen data corresponding to a currently presented portion of the ongoing online meeting and second screen data corresponding to one of the plurality of screenshots in the summary document, wherein the second screen data includes stored screen data from a previously presented portion of the ongoing online meeting, wherein the first screen data is presented picture-in-picture inside the second screen data or the second screen data is presented picture-in-picture inside the first screen data, wherein presenting the first screen data corresponding to the currently presented portion of the ongoing online meeting includes presenting live screen and audio data of the ongoing online meeting, and wherein presenting the second screen data corresponding to the screenshot includes displaying screen data from the previously presented portion of the online meeting corresponding to the point in time in the previously presented portion of the meeting indicated by the timestamp associated with the one of the plurality of screenshots in the summary document.

19. The computer-readable medium of claim 18, further comprising instructions to transmit the summary document to the viewer computing device attending the meeting.

20. The computer-readable medium of claim 18, further comprising:
   instructions to receive an annotation from the viewer computing device attending the meeting; and
   instructions to add the annotation to the summary document.

21. The computer-readable medium of claim 20, wherein the annotation is encrypted.

22. The computer-readable medium of claim 20, wherein the annotation is unencrypted.

23. The computer-readable medium of claim 18, wherein at least one of the plurality of screenshots is encrypted.

24. A method for generating a summary document of an online meeting, the method comprising:
   storing, in computer memory, at least a portion of screen data representing a previously presented portion of an ongoing online meeting;
   capturing a plurality of screenshots in response to trigger events, each screenshot i) being based at least in part on the stored screen data and ii) being representable as an image thumbnail;
   combining the plurality of screenshots, thereby dynamically generating a summary document summarizing the ongoing online meeting, wherein the image thumbnails representing the plurality of screenshots are for facilitating navigating through the summary document while the ongoing online meeting is still ongoing;
   signaling for presenting, at a viewer computing device attending the meeting, simultaneously and while the ongoing online meeting is still ongoing, first screen data corresponding to a currently presented portion of the ongoing online meeting and second screen data corresponding to one of the plurality of screenshots in the summary document, wherein the second screen data includes stored screen data from a previously presented portion of the ongoing online meeting, and wherein the first screen data is presented picture-in-picture inside the second screen data or the second screen data is presented picture-in-picture inside the first screen data;
   receiving a plurality of annotations from the viewer computing device attending the meeting, wherein each of the annotations is associated with one of the plurality of screenshots;
   adding the annotations to the summary document; and
   displaying the summary document by displaying the plurality of screenshots and the annotations, wherein the displaying includes i) displaying an author of each of the annotations, ii) displaying a first subset of the annotations on the associated screenshots, and iii) displaying a second subset of the annotations as text outside the associated screenshots.

* * * * *